(12) United States Patent
Shimizu et al.

(10) Patent No.: US 8,415,423 B2
(45) Date of Patent: Apr. 9, 2013

(54) MELT-KNEADED PRODUCTS AND MOLDED RESIN PRODUCTS

(75) Inventors: Hiroshi Shimizu, Tsukuba (JP); Yongjin Li, Tsukuba (JP)

(73) Assignee: National Institute of Advanced Industrial Science and Technology, Tokyo (JP)

(*) Notice: Subject to any disclaimer, the term of this patent is extended or adjusted under 35 U.S.C. 154(b) by 0 days.

(21) Appl. No.: 13/014,570

(22) Filed: Jan. 26, 2011

(65) Prior Publication Data

US 2011/0124793 A1    May 26, 2011

Related U.S. Application Data

(62) Division of application No. 12/028,213, filed on Feb. 8, 2008, now Pat. No. 7,935,417.

(30) Foreign Application Priority Data

Mar. 23, 2007   (JP) .................................. 2007-76639
Feb. 6, 2008   (JP) ................................ 2008-025964

(51) Int. Cl.
B32B 5/16      (2006.01)
B29B 7/90      (2006.01)

(52) U.S. Cl.
USPC ........... 524/545; 977/742; 977/646; 977/773; 977/752; 428/323; 366/90; 524/496; 524/574; 524/571; 524/599

(58) Field of Classification Search .................. 524/545, 524/524, 496, 574, 571, 599; 977/742, 646, 977/773, 752; 428/323; 366/90
See application file for complete search history.

(56) References Cited

U.S. PATENT DOCUMENTS

| | | | |
|---|---|---|---|
| 4,857,600 A | 8/1989 | Gross et al. | |
| 5,502,143 A | 3/1996 | Oie et al. | |
| 5,575,965 A | 11/1996 | Caronia et al. | |
| 2006/0062715 A1 | 3/2006 | Endo et al. | |
| 2008/0045657 A1 | 2/2008 | Shimizu et al. | |
| 2010/0255207 A1* | 10/2010 | Neubauer et al. | 427/389.9 |

FOREIGN PATENT DOCUMENTS

| | | | |
|---|---|---|---|
| JP | 07-102112 A | 4/1995 | |
| JP | 2004-338327 A | 12/2004 | |
| JP | 2005-088767 A | 4/2005 | |
| JP | 2005-097499 A | 4/2005 | |
| JP | 2005-313608 A | 11/2005 | |
| JP | 2005-314019 A | 11/2005 | |
| JP | 2006-111515 A1 | 4/2006 | |
| JP | 2006-124613 A | 5/2006 | |
| JP | 2006-282842 A1 | 10/2006 | |

OTHER PUBLICATIONS

R. Andrews, et al., "Nanotube composite carbon fibers," Applied Physics Letters, vol. 75, No. 9, pp. 1329-1331, Aug. 30, 1999.
R. Haggenmueller, et al., "Aligned single-wall carbon nanotubes in composites by melt processing methods," Chemical Physics Letters, 330, pp. 219-225, Nov. 10, 2000.
S. Badaire, et al., "In Situ Measurements of Nanotube Dimensions in Suspensions by Depolarized Dynamic Light Scattering," Langmuir 2004, 20, pp. 10367-10370.
N. Nakashima, "Walter-Soluble Single-Walled Carbon Nanotubes via Noncovalent Sidewall-Functionalization with a Pyrene-Carrying Ammonium Ion," Chemistry Letters 2002, pp. 638-639.
J. Liu, et al., "Fullerene Pipes," Science, vol. 280, pp. 1253-1256, May 22, 1998.
J. Chen, et al., "Solution Properties of Single-Walled Carbon Nanotubes," Science, vol. 282, pp. 95-98, Oct. 2, 1998.
M.F. Islan, "High Weight Fraction Surfactant Solubilization of Single-Wall Carbon Nanotubes in Water," Nano Letters 2003, vol. 3, No. 2, pp. 269-273.
Hiroshi Shimizu, "Development of New Nano-Dispersing Kneading Technology for Different Polymers and Fillers—High Shear Mold Processing Method-", Polyfile, Feb. 10, 2007, p. 26-29, vol. 44, No. 516, Japan.
Hiroshi Shimizu, et al. "Homogeneous Dispersion of MWCNT in Polymer Matrix Using High-Shear Processing", Polymer Preprints, The Society of Polymer Science, Sep. 4, 2007, vol. 56 No. 2, 3Pc041 3880 (Conference: Sep. 19-21, 2007), Japan.
Guang-Xin Chen, et al. "Ultrahigh-shear processing for the preparation of polymer/carbon nanotube composites", Carbon 45, Aug. 6, 2007, p. 2334-2340.
Yongjin Li, et al. "High-shear processing induced homogeneous dispersion of pristine multiwalled carbon nanotubes in a thermoplastic elastomer", Polymer 48, Mar. 2, 2007, p. 2203-2207.

* cited by examiner

*Primary Examiner* — Robert D. Harlan
(74) *Attorney, Agent, or Firm* — Law Office of Katsuhiro Arai

(57) ABSTRACT

A melt-kneaded product includes: a disperse medium selected from an a rubber, elastomer, thermoplastic resin, or thermosetting resin; and a filling material constituted by nano-size filler particles having a mutually aggregating nature, said nano-size filler particles being uniformly dispersed in the disperse medium.

12 Claims, 19 Drawing Sheets

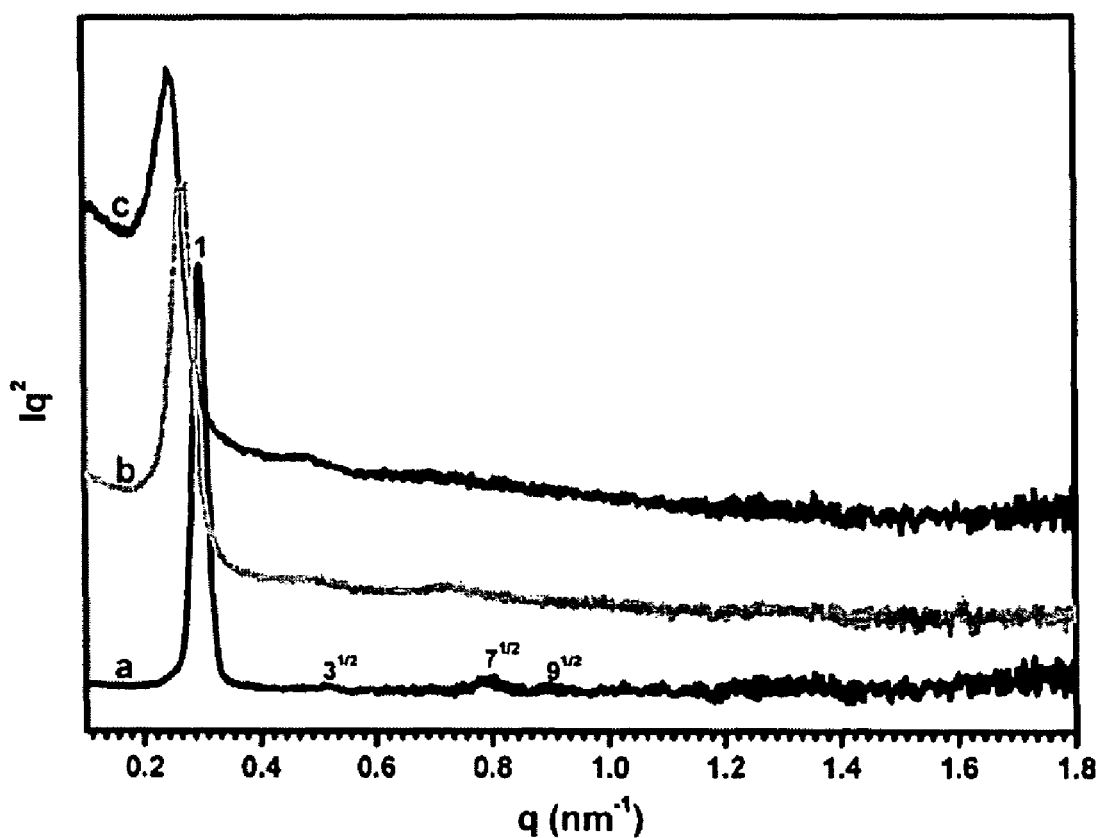

(a)

(b)

MELT-KNEADED PRODUCTS AND MOLDED RESIN PRODUCTS

CROSS REFERENCE TO RELATED APPLICATIONS

This is a divisional application of U.S. patent application Ser. No. 12/028,213, field Feb. 8, 2008, the disclosure of which is herein incorporated by reference in its entirety.

BACKGROUND OF THE INVENTION

1. Field of the Invention

The present invention relates to a melt-kneading method for rubber, elastomer, thermoplastic resin or thermosetting resin whereby a filling material constituted by a nano-level filler is uniformly dispersed in a rubber, elastomer, thermoplastic resin or thermosetting resin. It also relates to a melt-kneaded product of rubber, elastomer, thermoplastic resin or thermosetting resin produced by uniformly dispersing a filling material constituted by a nano-level filler in a rubber, elastomer, thermoplastic resin or thermosetting resin, as well as a molded product constituted by such melt-kneaded product.

2. Description of the Related Art

Production methods for melt-kneaded products in which nano-level fillers such as fine silica grains, single-walled carbon nanotubes (SWCNT), multi-walled carbon nanotubes (MWCNT), carbon fibers (CF), carbon blacks (CB) and clay are uniformly dispersed, as well as melt-kneaded products obtained by these production methods, are already known, and attempts to produce molded resin products by molding these melt-kneaded products have been made. However, examination of the characteristics of obtained molded resin products finds that they are not as good as expected and do not necessarily provide satisfactory results.

Elastomers and rubbers that are high-molecular substances exhibiting rubber elasticity at room temperature are used in a wide range of fields and broad industries such as interior parts of automobiles, construction members, packing and container materials, and medical parts, among others. Essentially, elastomers and rubbers have such properties as low elastic modulus and high elongation at break. It has been known that by adding fillers and reinforcement fibers to elastomers and rubbers, the characteristics of fillers and reinforcement fibers can be added to elastomers and rubbers and also elastomers and rubbers having a high elastic modulus, a characteristic not found in elastomers and rubbers, can be produced.

By mixing these two groups of substances, the functions of the material substances can be demonstrated fully while new characteristics not inherent in each material substance can be added, and resulting materials can meet diverse needs of industries. Accordingly, every time such application is implemented, an elastomer offering appropriate performance values is selected from a wide range of elastomers.

On the other hand, thermoplastic resins and thermosetting resins inherently have a high modulus of elasticity and low elongation at break. Resin complexes having the characteristics of fillers, etc., have been manufactured by adding fillers to thermoplastic resins or thermosetting resins to demonstrate the functions of fillers while making use of the characteristics of thermoplastic resins and thermosetting resins.

In these cases, it has been suggested that it is important to add a filling material, such as a filler, to a rubber, elastomer, thermoplastic resin or thermosetting resin and disperse the filler, etc., both uniformly and at nano level. However, achieving such uniform dispersion is technically difficult. In particularly, uniformly dispersing nano-level fillers is believed to involve a high degree of technical difficulty.

Nano-size level fillers, such as carbon nanotubes, clay (layer silicate), fine silica grains and cage polysilsesquioxane compounds, have an extremely strong cohesive force among filler grains because the grain sizes and void ratios of primary grains are small and it is difficult to remove this cohesive force using normal methods.

For example, we can examine conventional methods using specific examples of carbon nanotubes.

With carbon nanotubes, which are known as nano-level substances, prevention of cohesion is given utmost priority. Traditional methods, therefore, have been to prevent cohesion first and then produce a stable dispersion liquid, and finally mix this dispersion liquid entirely with a high-molecular material matrix to disperse carbon nanotubes. Specific examples are described below.

Methods to physically mix carbon nanotubes in a solution with a polymer composition (Non-patent Literature 1, Appl. Phys, Lett., 1999; 75; 1329, etc.), as well as methods to dissolve carbon nanotubes in a molten polymer composition (Non-patent Literature 2, Chem. Phys. Lett., 2000; 330; 219, etc.), have been attempted. In applications where a filler is added to a resin, naturally methods to melt the resin, etc., add the filler, and then knead them using a knead extruder, etc., are known. For example, known methods include those where a semi-conductive shielding plate is formed using a material made by mixing and dispersing carbon nanotubes in a polyethylene, polypropylene or mixture thereof, wherein a conventional extruder is used to mix the carbon nanotubes (Patent Literature 1, U.S. Pat. No. 4,857,600 and Patent Literature 2, U.S. Pat. No. 5,575,965); and those where a molded resin product whose main ingredient is a resin or elastomer contains nano-scale carbon nanotubes and, if the aforementioned resin is a thermoplastic resin, its melt index (MI) is identified, while the Williams plasticity number is identified if an elastomer is used (Patent Literature 3, Japanese Patent Laid-open No. 2005-88767; Patent Literature 4, Japanese Patent Laid-open No. 2004-338327; and Patent Literature 5, Japanese Patent Laid-open No. 2005-314019); among others.

However, as mentioned earlier nano-size level fillers, or specifically carbon nanotubes, clay (layer silicate), fine silica grains and cage polysilsesquioxane compounds, have an extremely strong cohesive force among filler grains because the grain sizes and void ratios of primary grains are small and it is difficult to remove this cohesive force using the aforementioned methods. In other words, the aforementioned methods have not been able to solve the fundamental problems.

Since the aforementioned methods cannot provide definite solutions, dispersing these nano-size level fillers in elastomers or resins normally requires adding a surface active agent or chemically modifying a filler to increase the affinity between the filler and resin. Methods to do this are already proposed.

Various methods are known for preparing a carbon nanotube dispersion liquid, including the following:

1) A method to disperse carbon nanotubes using an ultrasonic dispersion means is known (Non-patent Literature 3, Langumuir, 2004; 20; 10367). Also, there is a method to produce a water-soluble, single-walled carbon nanotube by introducing a substituent group containing ammonium ions to the pyrene molecule and then applying ultrasonic treatment to the pyrene molecule together with a single-walled carbon nanotube in water to cause the pyrene molecule to be adsorbed to the single-walled carbon nanotube in a noncovalent-bonding manner, by utilizing the fact that the pyrene molecule adsorbs to the carbon nanotube surface due to strong interaction (Non-patent Literature 4, Chem. Lett., 638 (2002)).

2) Methods are known for introducing a hydrophilic function group to the surface of a carbon nanotube by means of acid treatment to improve the dispersibility of the carbon nanotube in various solvents, and then mixing a dispersion liquid with a polymer solution to produce a composite. For example, a method to disperse a single-walled carbon nanotube in a strong acid by means of ultrasonic treatment (Non-patent Literature 5, Science, 280, 1253 (1998)), as well as a method to convert a carboxylic acid group into an acid chloride and then cause the acid chloride to react with an amine compound, after which a long-chain alkyl group is introduced to obtain a product soluble in solvents, by focusing on the fact that single-walled carbon nanotubes have open ends and terminated by oxygen-containing function groups such as carboxylic acid groups (Non-patent Literature 6, Science, 282, 95 (1998)), are known.

3) There is a method to disperse carbon nanotubes in various solvents by coating them with surface active agents and other specific polymers that adsorb to carbon nanotubes (Non-patent Literature 7, Nano Lett., 2003; 3; 269).

However, these methods require complicated operations because the process is implemented in a strong acid, and the effect on dispersion is not sufficient. Also in certain situations such as when a long-chain alkyl group is introduced, some problems emerge including damaged graphene sheet structure of carbon nanotube and affected characteristics of the carbon nanotube itself.

Carbon-nanotube-containing compositions containing a (a) conductive polymer, (b) solvent, (c) carbon nanotube, and if necessary, (d) high-molecular compound, (e) basic compound, (f) surface active agent, (g) silane coupling agent and/or (h) colloidal silica, complexes having a coating film constituted by any of the aforementioned compositions, as well as production methods thereof, are known (Patent Literature 6, Japanese Patent Laid-open No. 2005-97499 and Patent Literature 7, Japanese Patent Laid-open No. Hei 7-102112). These methods allow for uniform dispersion using a solvent and silane coupling agent. However, use of many additive constituents inevitably makes their operation complicated. Although these methods are expected to achieve extremely favorable characteristics for polyimide and other high-molecular compounds, nanocomposites using carbon nanotubes, despite having the above advantages, still present a problem in that dispersing carbon nanotubes uniformly in a resin is extremely difficult because carbon nanotubes become bundled or assume a rope-like form due to their mutual cohesive force (van der Waals force). In particular, smooth surface of carbon nanotubes at atomic level is one factor that reduces the affinity between carbon nanotubes and base material.

Polyimides are generally difficult to dissolve in solvents and when a polyimide is used in a nanocomposite, mixing and dispersing nanograins is difficult. There are methods wherein, by focusing on the fact that polyimides produced by block-copolymerization can be dissolved in solvents, a block-copolymerized polyimide and carbon nanotubes are mixed with a solution produced by dispersing a nonionic surface active agent and/or polyvinyl pyrrolidone (PVP) in an amide polar organic solvent, especially NMP (N-methyl pyrrolidone) and/or dimethyl acetamide (DMAC), or alternatively a polyamic acid, which is a precursor of polyimide, and carbon nanotubes are mixed with a solution produced by dispersing a nonionic surface active agent and/or polyvinyl pyrrolidone (PVP) in an amide polar organic solvent, especially NMP (N-methyl pyrrolidone) and/or dimethyl acetamide (DMAC), in order to obtain a polyamic acid solution in which carbon nanotubes are dispersed, after which the obtained solution is dehydrated to obtain a polyimide in which carbon nanotubes are uniformly dispersed (Patent Literature 9, Japanese Patent Laid-open No. 2006-124613). Here, too, a complicated process is required.

After all, the above methods do not solve the problems mentioned above.

Looking at the aforementioned problems, the inventors feel that, because nano-size level fillers such as carbon nanotubes, clay (layer silicate), fine silica grains and cage polysilsesquioxane compounds have an extremely strong cohesive force among filler grains because the grain sizes and void ratios of primary grains are small, finding a method to remove this cohesive force is the only way to solve the problems. In fact, there is an urgent need to solve these problems.

[Patent Literature 1] U.S. Pat. No. 4,857,600
[Patent Literature 2] U.S. Pat. No. 5,575,965
[Patent Literature 3] Japanese Patent Laid-open No. 2005-88767
[Patent Literature 4] Japanese Patent Laid-open No. 2004-338327
[Patent Literature 5] Japanese Patent Laid-open No. 2005-314019
[Patent Literature 6] Japanese Patent Laid-open No. 2005-97499
[Patent Literature 7] Japanese Patent Laid-open No. Hei 7-102112
[Patent Literature 8] U.S. Pat. No. 5,502,143
[Patent Literature 9] Japanese Patent Laid-open No. 2006-124613
[Non-patent Literature 1] Appl. Phys. Lett., 1999; 75; 1329
[Non-patent Literature 2] Chem. Phys. Lett., 2000; 330; 219
[Non-patent Literature 3] Langumuir, 2004; 20; 10367
[Non-patent Literature 4] Chem. Lett., 638 (2002)
[Non-patent Literature 5] Science, 280, 1253 (1998)
[Non-patent Literature 6] Science, 282, 95 (1998)
[Non-patent Literature 7] Nano Lett., 2003; 3; 269

SUMMARY OF THE INVENTION

The object to be solved by at least an embodiment of the present invention is to provide a new method for mixing and kneading a nano-size level filler, such as a carbon nanotube, with a molten resin of any of various rubbers, elastomers, thermoplastic resins or thermosetting resins; wherein such method only involves adding a shear flow field by a physical means not heretofore known to a filling material of nano-level size, or specifically a single-walled carbon nanotube, multi-walled carbon nanotube, carbon fiber, carbon black, fine clay grain, fine silica grain or cage polysilsesquioxane (POSS) compound filler, without adding any surface active agent or chemically modifying the filler beforehand.

After analyzing the prior arts, it was concluded that the following approach would be effective in solving the above object.

To disperse a filler in an elastomer or resin uniformly at nano level, mainly two factors must be eliminated. To be specific, the following two problems must be solved successfully:

(A) Enhance the affinity and interaction between the resin and filler.

(B) Prevent cohesion among filler grains.

The points made in (A) and (B) above are examined below individually.

One effective solution to achieve (A) is to modify the resin or filler or both using a chemical method to enhance the interaction between the two. For example, a function group having high reactivity can be partially bonded with the filler, so that the point where the functional group is bonded serves as an activation point to significantly improve the interaction between the resin and filler. With this solution, however, it is not possible to achieve uniform dispersion with practical materials in view of the degree of effectiveness achieved by the solution. This limitation makes it impossible to achieve the desired result using this method.

On the other hand, a general solution to achieve (B) is to add a cohesion suppressant to chemically suppress cohesion. However, it is clear that adding a cohesion suppressant alone does not solve the ultimate object of non-uniform dispersion of a nano-level filler in an elastomer or resin.

The obvious conclusion is that uniform dispersion of a filler in a resin at nano level is impossible to achieve through efforts that aim at individually achieving the aforementioned two operations using conventional methods.

On the contrary, cohesion among filler grains—the effect to be prevented by operation (B)—must be regarded as something inevitable, and an effective processing means that more than offsets this cohesive force must be created using an external factor. It was concluded therefore that creating a high-shear fluid state using an external factor would be the best course of action.

By creating a high-shear fluid state, not only the cohesion among filler grains can be suppressed, but also such shear flow field achieves separation and isolation of filler grains. It also becomes possible to apply the interaction between the resin and filler in this processing field. As a result, therefore, adoption of this method makes it possible to uniformly disperse a nano-level filler in a resin by simultaneously solving (A) and (B).

A conclusion was reached that a composition obtained by this processing means based on nano-dispersion would provide dramatically improved performance and function because of its structure and thereby allow for development of new materials using such composition.

1) The inventors diligently studied the aforementioned object and examined new methods and means for uniformly dispersing a filler or other filling material of nano-level size, or specifically a single-walled carbon nanotube (SWCNT), multi-walled carbon nanotube (MWCNT), carbon fiber (CF), carbon black (CB), clay (layer silicate), fine silica grains or cage polysilsesquioxane (POSS) compound, in an elastomer or resin, without using the conventional methods mentioned above, and ultimately gained the following knowledge.

2) To uniformly disperse a filling material of nano-level size, such as any of the aforementioned fillers (in the present invention, a multi-walled carbon nanotube (MWCNT) is used as a representative example) in an elastomer or resin, the elastomer or resin should be maintained in a melt-kneaded state. To be specific, a filling material constituted by a filler, and an elastomer or resin, are supplied from a material introduction part 16 into a melt-kneading part 12 having a cylinder 18, feedback screw 20 and heater, to melt the elastomer or resin and knead it with the filling material under the conditions of 1000 to 3000 rpm in the rotation speed of the screw and 1500 to 4500 $sec^{-1}$ in shear speed. Next, the mixture comprising the elastomer or resin and filling material is fed from the rear edge to tip of the screw to be trapped in a space 32 at the tip of the screw, after which the mixture is returned from the space 32 to the rear edge of the screw through a hole 44 provided at the center of the screw, and then fed again to the tip of the screw, with this cycle operation performed for a specified period (FIGS. 1 and 2). This way, an effective shear speed can be added to the mixture containing the elastomer or resin, and the filler/filling material, during melt-kneading, so that the filler/filling material can be uniformly dispersed in the molten elastomer or resin, thereby solving the aforementioned object.

3) The melt-kneading part has a seal and connects to a sample introduction part that introduces a sample through a sample introduction port. The interval between the tip surface of the aforementioned screw and the seal surface facing the tip surface is 0.5 to 5 mm, while the inner diameter of the hole in the screw is 1 to 5 mm, or preferably 2 to 3 mm. Under the conditions of 1000 to 3000 rpm in screw rotation speed, 1500 to 4500 $sec^{-1}$ in shear speed, and heating temperature corresponding to room temperature or above the temperature of the resin to be melt-kneaded, the aforementioned melt-kneaded resin is fed from the rear edge to tip of the screw to be trapped in the space at the tip of the screw, after which the resin is moved from the aforementioned space to the rear edge of the screw through the hole provided at the center of the screw, and then processed again by the screw, with this cycle performed for a specified period to melt-knead the aforementioned filling material and resin. It was found that by using a melt-kneading method based on this melt-kneading process, an optimal shear speed could be added to produce a kneaded resin to solve the aforementioned object.

4) In addition, it was found that a molding method whereby the melt-kneaded product obtained by the aforementioned melt-kneading method is subsequently passed through T-dies, as well as a molded product obtained by such molding method, can be obtained.

5) It was found that the effective content of the aforementioned filling material would be 0.01 to 30.0 percent by weight relative to 100 percent by weight of the resin.

Effects of the Invention

According to at least an embodiment of the present invention, a melt-kneading method to uniformly disperse a filling material constituted by a filler in a rubber, elastomer, thermoplastic resin or thermosetting resin is provided and that, by using this melt-kneading method a melt-kneaded product in which a filling material constituted by a filler is uniformly dispersed in a rubber, elastomer, thermoplastic resin or thermosetting resin can be obtained.

In addition, by subsequently molding the product obtained by the melt-kneading method using T-dies or various other dies, a molded product in which a filling material constituted by a filler is uniformly dispersed in a rubber, elastomer, thermoplastic resin or thermosetting resin can be obtained.

If a rubber or elastomer is used, the obtained product exhibits excellent elastomer properties such as flexibility, rubber elasticity and shape recoverability after deformation, while the characteristics of the filler constituting the filling material can also be exhibited fully to dramatically improve the mechanical performance properties such as high modulus of elasticity and elongation at break, and also improve the electrical conductivity, so that the obtained elastomer product can be used widely in various parts and members including films, sheets and tubes, in the forms of flexible hoses, rings and sealants, for example.

Also, a thermoplastic resin or thermosetting resin can be used to create a material offering excellent characteristics, by fully demonstrating the characteristics of the filler constituting the filling material, for use in automotive parts and in various other fields including electrical and electronics. The achieved material is also useful as a vibration-absorbing material or anti-vibration material offering favorable electrical characteristics such as dramatically improved modulus of elasticity and other mechanical performance characteristics as well as electrical conductivity.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

FIG. 6 shows Lorenz-corrected SAXS profiles. A pure sample, sample processed at 1000 rpm, and sample processed at 2000 rpm are shown as (a), (b) and (c), respectively.

DESCRIPTION OF SYMBOLS

Figure 1:
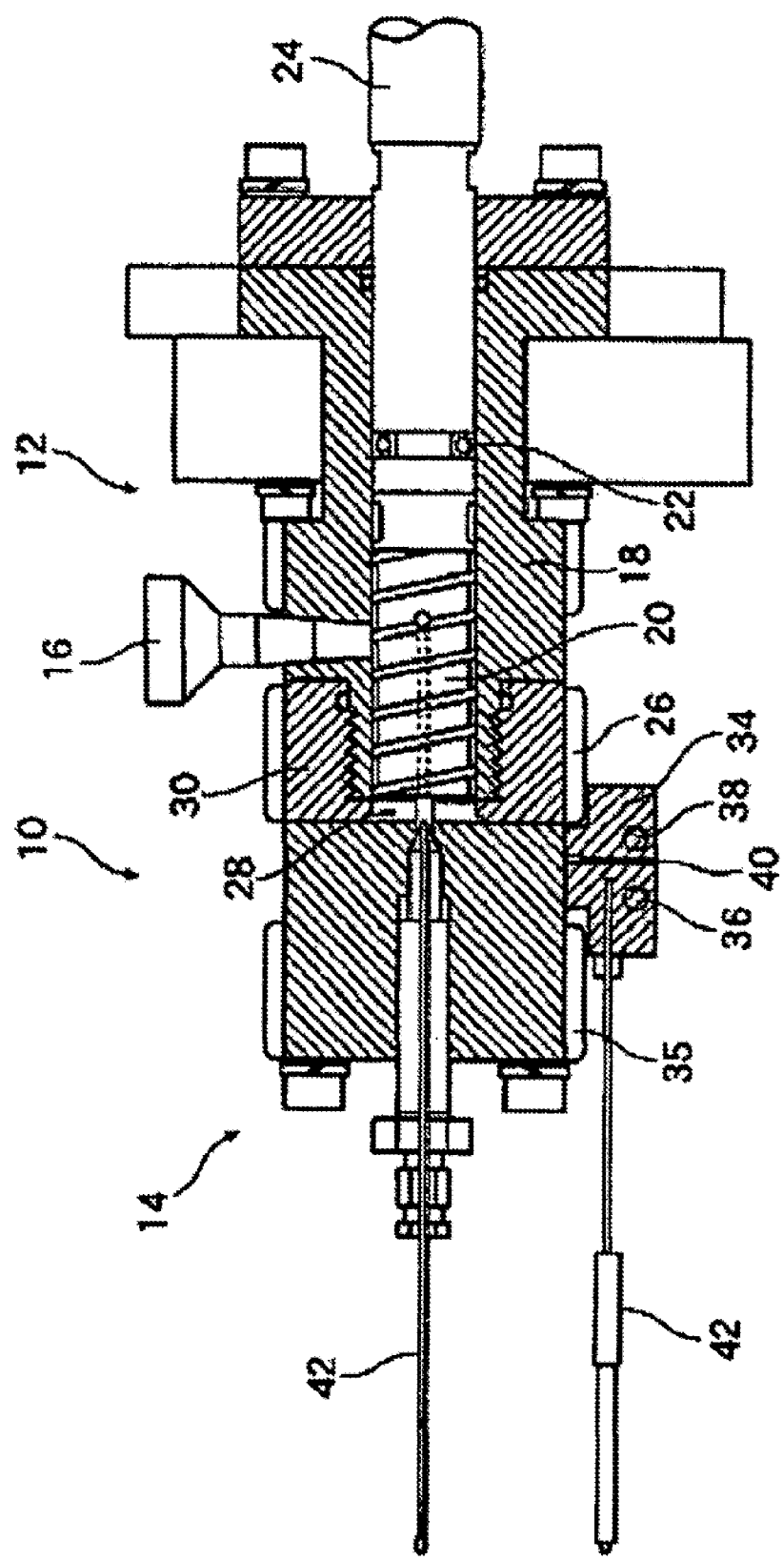
FIG. 1 is a general view of an apparatus that can be used under the present invention for producing a melt-kneaded product or molded product in which a filling material constituted by a nano-level filler is uniformly dispersed in an elastomer or resin.

10: Melt-kneaded product manufacturing apparatus
12: Melt-kneading part
14. Molding part
16: Material feed part
18: Cylinder
20: Feedback screw
22: Bearing
24: Shaft
26: Heater
28: Seal
30: Adjustment means for adjusting space
32: Space
35: Heater
36: T-die front edge heater
38: T-die rear edge heater
40: Discharge port
42: Thermocouple
44: Hole
46: Internal feedback screw structure
48: Screw rear
50: Screw front

DETAILED DESCRIPTION OF THE PREFERRED EMBODIMENT

A melt-kneading method according to at least one embodiment of the present invention, and a melt-kneaded product obtained by such melt-kneading method, are explained below in details. It should be noted, however, that the present invention is not at all limited to these embodiments.

FIG. 1 is a general view of an example of an apparatus for manufacturing a melt-kneaded product and molded product in which a filling material constituted by a nano-level filler is uniformly dispersed in a rubber, elastomer, thermoplastic resin or thermosetting resin.

Figure 2:
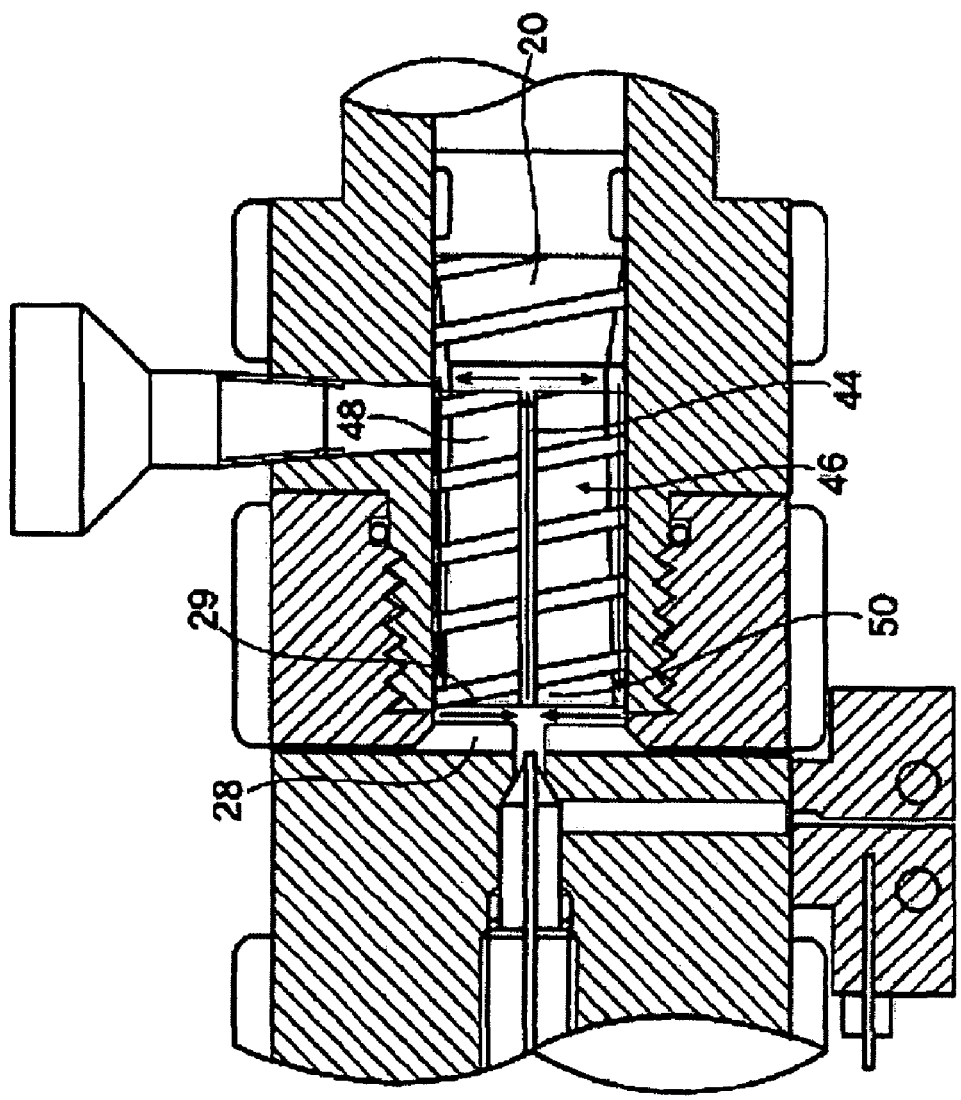
FIG. 2 is a detailed view explaining a feedback screw in a melt-kneading part and recirculation of a melt-kneaded product in an embodiment of the present invention.

FIG. 2 is a drawing explaining an example of a feedback screw in a melt-kneading part.

Figure 3:
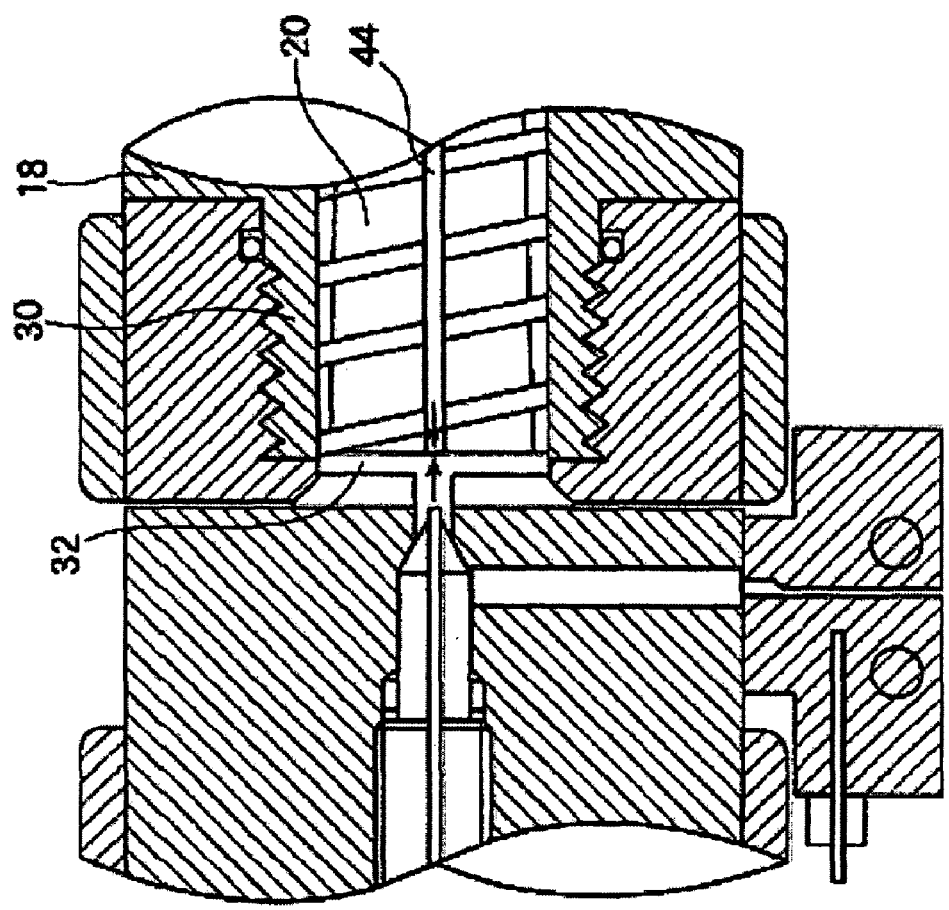
FIG. 3 is a drawing explaining a space at a front edge of a feedback screw in a melt-kneading part in an embodiment of the present invention.

FIG. 3 is a drawing explaining a space at a front edge of a feedback screw in a melt-kneading part.

A melt-kneaded product manufacturing apparatus 10 comprises a material feed part 16 through which to feed the material substances including a filling material constituted by a filler, and an elastomer or resin, along with a melt-kneading part 12 and a molding part 14.

The melt-kneading part 12 has a feedback screw 20 in a cylinder 18. The feedback screw 20 is installed in the cylinder 18 via a shaft 24. The shaft 24 connects to the feedback screw 20 via a bearing 22. Also, the cylinder 18 has a heater 26 to melt the resin along the outer side of the cylinder. At the edge of the cylinder 18 opposite to where the shaft 24 is positioned, a seal 28 is provided to seal the melt-kneading part 12 and molding part 14. In addition, the cylinder 18 has an adjustment means 30 for adjusting a space 32 between a tip end surface 29 of the feedback screw 20 and a seal surface 28. The space 32 can be adjusted in a range of 0.5 to 5 mm (FIGS. 2 and 3).

The molding unit 14 has an extrusion heater 35 and T-dies 34 for producing film. The T-dies 34 have a T-die front edge heater 36 and a T-die rear edge heater 38. Extruded film passes a discharge port 40 formed between the T-die front edge heater 36 and T-die rear edge heater 38. Thermocouples 42 are inserted in the molding part and T-die front edge heater to measure temperatures. The measured temperatures are sent to a control unit (not illustrated) for use in the temperature control of the melt-kneading part 12 and T-dies.

Inside the screw 20 is an interior hole 44 with an inner diameter of 1 to 5 mm, or preferably 2 to 3 mm. The L/D ratio (L: length, D: diameter) of the feedback screw 20 is 1.78. The rotation speed of the screw, which is adjusted within a range of 1000 to 3000 rpm, is enough to adjust the shear speed within a range of 1500 to 4500 sec$^{-1}$. The temperature in the cylinder varies according to the resin to be melted.

The screw has a structure sufficient to melt the resin inside the cylinder. FIG. 2 shows an internal feedback screw structure 46. Inside the internal feedback screw structure 46, the resin fed from a screw rear 48 is moved to a screw front 50 by means of the screw. The molten resin is trapped in the space 32 formed between the front surface 29 and seal surface 31. The resin travels through the lateral hole 44 provided at the center of the screw, and another hole facing a different direction, to reach the screw rear 48 and then move toward the screw front 50 again.

The required shear melting time can be changed according to the time needed to circulate the resin through the internal feedback screw structure 46. The degree at which the resin is sheared can be adjusted by changing the space formed between the rear edge of the screw and the seal surface diametrically connected to the rear edge and interior of the screw. The degree at which the resin is sheared can be raised by reducing the space or reducing the diameter of the hole. The space and the inner diameter of the screw hole must be optimal from the viewpoint of the viscosity of the resin. The time needed to melt-knead the resin in the cylinder is 1 to 8 minutes.

The melt-kneading method according to an embodiment of the present invention is explained below.

A filling material constituted by a filler, as well as an elastomer or resin, are introduced from the material introduction part 16 and fed to the melt-kneading part 12 having the screw 20 and cylinder with heater. The materials are fed forward by the action of the feedback screw 20.

The rotation speed of the aforementioned screw is adjusted to 1000 to 3000 rpm, while the shear speed is adjusted to 1500 to 4500 sec$^{-1}$, and the melt-kneaded elastomer or resin obtained by processing under these conditions is fed from the rear edge to tip of the screw. After trapped in the space 32 at the tip of the screw, the elastomer or resin is moved from the space 32 to the rear edge of the screw through the hole 44 provided at the center of the screw. The space 32 can be adjusted in a range of 0.5 to 5 mm (FIGS. 2 and 3).

The filling material constituted by a filler, being uniformly dispersed in the elastomer or resin, travels through the lateral hole 44 provided at the center of the screw to be trapped at the rear edge of the screw, and then recirculated to the screw front 50 through the screw rear 48 by the screw.

By repeating this cycle for 1 to 8 minutes, the filling material constituted by a filler is uniformly dispersed in the molten elastomer or resin.

The melting/heating temperature is set to room temperature or a temperature higher than the temperature of the resin to be melt-kneaded. If the melting temperature of the resin to be melt-kneaded is lower than room temperature, the melting/heating temperature is set to room temperature. If the melting temperature of the resin to be melt-kneaded is higher than room temperature, the melting/heating temperature is set to the melting temperature of the resin to be melt-kneaded.

If the material rubber, elastomer or resin has high viscosity, the possibility of heat generation due to shearing is high. In this case, a cooling mechanism (not illustrated) is used to introduce cooling water intermittently to cool the melt-kneading part 12 to prevent the resin temperature monitored by a temperature sensor 42 from rising.

If the screw rotation speed is less than 1000 rpm and the shear speed is less than 1500 sec$^{-1}$, melt-kneading operation is not implemented fully and a satisfactory result cannot be obtained. On the other hand, a process at a screw rotation speed exceeding 3000 rpm and shear speed exceeding 4500 sec$^{-1}$ cannot achieve a particularly favorable melt-kneaded state. As a result, it is important to keep the screw rotation speed within a range of 1000 to 3000 rpm, and shear speed within a range of 1500 and 4500 sec$^{-1}$. As for the screw shape, any commonly used shape can be used as long as it has a hole through which to feed back the sample.

After 1 to 8 minutes of repeated cycle operation, the molten elastomer or resin in which the filling material constituted by a filler is more uniformly dispersed is taken out from the space 28 into the molding unit 14. Here, the elastomer or resin is taken out into the molding unit 14 by opening a valve (not illustrated).

The extrusion heater 35 and T-dies 34 for producing film are provided. The T-dies 34 have the T-die front edge heater 36 and T-die rear edge heater 38. The extruded film is taken out from the discharge port 40 formed between the T-die front edge heater 36 and T-die rear edge heater 38. Thermocouples 42 are inserted in the molding part and T-die front edge heater to measure temperatures. The measured temperatures are sent to a control unit (not illustrated) for use in the temperature control of the melt-kneading part 12 and T-dies.

One of the processed targets may be an elastomer, rubber, thermoplastic resin or thermosetting resin.

As one characteristic required of this elastomer, rubber, thermoplastic resin or thermosetting resin, it must be possible to maintain the elastomer, rubber, thermoplastic resin or thermosetting resin in a uniformly melt-kneaded state by means of heating.

Thermoplastic resins that can be used include polyolefin resins (such as high-density polyethylenes (HDPE), low-density polyethylenes (LDPE), ultrahigh molecular weight polyethylenes (UHMWPE), isotactic polypropylene, syndiotactic polypropylene and other polypropylenes (PP), and ethylene propylene copolymer resins), polyamide resins (such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer and nylon 66/PPS copolymer), polyester resins (such as polylactic acids (PLLA), polycarbonates (PC), polybutylene terephthalates (PBT), polyethylene terephthalates (PET), polyethylene isophthalates (PEI), polyester copolymers, PET/PEI copolymers, polyalylates (PAR), polybutylene naphthalates (PBN), liquid crystal polyesters, polyoxy alkylene diimide acid/polybutylate terephthalate copolymers and other aromatic polyesters), polyether resins (such as polyacetals (POM), polyphenylene oxides (PPO), polysulfones (PSF) and polyether ether ketone (PEEK)), polynitrile resins (such as polyacrylonitriles (PAN), polymethacrylonitriles, acrylonitrile/styrene copolymers (AS), methacrylonitrile/styrene copolymers and methacrylonitrile/styrene/butadiene copolymers), polymethacrylate resins (such as polymethyl methacrylates (PMMA) and polyethyl methacrylates), polyvinyl resins (such as vinyl acetates (EVA), polyvinyl alcohols (PVA), vinyl alcohol/ethylene copolymers (EVOH), polyvinylidene chlorides (PVDC), polyvinyl chlorides (PVC), polyvinyl/polyvinylidene copolymers and polyvinylidene/methyl acrylate copolymers), cellulose resins (such as cellulose acetates and cellulose acetate butylates), fluororesins (such as polyvinylidene fluorides (PVDF), polyvinyl fluorides (PVF), polychlorofluoroethyelens (PCTFE) and tetrafluoroethylene/ethylene copolymers (ETFE)), imide resins (such as aromatic polyimides (PI)), and polyacetals, among others.

These materials are all very well known and commercial products can be purchased and used.

In the examples, specific explanations are given using polyvinylidene fluorides (PVDF) and polylactic acids. PVDF has excellent chemical resistance and mechanical performance properties and is an indispensable class of materials used in an environment subject to chemical substances, gases, etc. Similarly, polylactic acids are also drawing the attention because they are synthesized from natural materials and exhibit specific decomposition properties.

Examples of thermosetting resins include epoxy resins, phenol resins, amino resins, unsaturated polyester resins, silicone resins, polyimide resins, polyurethane resins, aromatic hydrocarbon polymers (poly-p-phenylene and poly-p-xylene), aromatic heterocyclic polymers (polyhydantoin, polyparabanic acid, polybenzimidazol, polybenzthiazole, polyoxadiazole and polyquinoxaline), and thermosetting heat-resistant polymers (styrylpyridine resins and cynato resins), among others.

To obtain a uniform molten product by means of heating, a thermosetting resin can also be heated in a similar manner to how a thermoplastic resin is heated, so that a uniform molten product can be achieved.

The above resins are all known substances used for general purposes and commercial products can be purchased and used.

Accordingly, the specific examples of PVDF and polylactic acids indicate that the present invention can also be applied in a similar manner to other thermoplastic resins to obtain similarly favorable results. The above resins are all known substances used for general purposes and commercial products can be purchased and used.

Examples of elastomers and rubbers include diene rubbers and hydrogenated products thereof (such as NR, IR, epoxidated natural rubbers, SBR, BR (high-cis BR and low-cis BR), NBR, hydrogenated NBR and hydrogenated SBR), olefin rubbers (such as ethylene-propylene-diene rubber (EPDM), EPM and other ethylene propylene rubbers, maleic-acid denatured ethylene propylene rubbers (M-EPM), IIR, isobutylene and aromatic vinyl or diene monomer copolymers, acrylic rubbers (ACM) and ionomers), halogen-containing rubbers (such as Br-IIR, Cl-IIR, isobutylene paramethyl styrene copolymer bromides (Br-IPMS), CR, hydrin rubbers (CHR), chlorosulfonated polyethylenes (CSM), chlorinated polyethylenes (CM) and maleic-acid denatured chlorinated polyethylenes (M-CM)), silicon rubbers (such as methyl vinyl silicon rubbers, dimethyl silicon rubbers and methyl phenyl vinyl silicon rubbers), sulfur-containing rubbers (such as polysulfide rubbers), fluororubbers (such as vinylidene fluoride rubbers, fluorine-containing vinyl ether rubbers, tetrafluoroethylene-propylene rubbers, fluorine-containing silicon rubbers and fluorine-containing phosphazene rubbers), urethane rubbers, epichlorohydrin rubbers, and elastomers (such as styrene elastomers, olefin elastomers, ester elastomers, urethane elastomers and polyamide elastomers), among others.

In the examples, specific explanations are given using non-polar elastomers having no polar groups such as poly(styrene-b-butadiene-co-butylene-b-styrene) (SBBS), poly(styrene-butadiene-styrene) (SBS) and ethylene propylene rubbers, among others. Other elastomers can be applied in a similar manner. The aforementioned elastomers are all known substances and commercial products can be purchased and used. SBBS, SBS, etc., are thermoplastic elastomers and therefore need not be crosslinked like natural rubbers. Accordingly, these substances offer excellent rubber-like elasticity while allowing easy molding just like normal resins.

Elastomers and rubbers must become a uniform molten state and maintain a kneaded state.

Just like in these examples, the present invention can also be applied to other elastomers and rubbers in a similar manner.

The other processed target is a filling material constituted by a filler.

The filling material constituted by a filler is a nano-size level filler, or specifically a carbon nanotube, clay (layer silicate), fine silica grains or cage polysilsesquioxane compound. These substances have small grain sizes and void ratios of primary grains and therefore exhibit an extremely strong cohesive force among filler grains. They exist in a mutually bonded state and it has been considered difficult to remove this cohesive force using normal methods.

By feeding a filling material constituted by a filler into a molten elastomer, rubber, thermoplastic resin or thermosetting resin existing in a mutually bonded state, and adding a shear flow field by a physical means not heretofore known, the inherent mutual bonding property of the filling material constituted by a filler can be eliminated and the filler can be returned to a standalone state as much as possible. Then, this filler in a standalone state can be uniformly dispersed and melt-kneaded in the uniformly molten elastomer, rubber, thermoplastic resin or thermosetting resin. As a result, the characteristics unique to the filler can be added in a manner where the filler is uniformly dispersed and melt-kneaded.

Examples of filling materials constituted by a filler include carbon nanotubes, carbon fibers (CF), carbon blacks (CB), fine clay grains (layer silicates), fine silica grains and cage polysilsesquioxane (POSS) compounds, among others.

Carbon nanotubes include single-walled carbon nanotubes (SWCNT) and multi-walled carbon nanotubes (MWCNT).

A single-walled carbon nanotube (SWCNT) is a round seamless tube formed by a cylinder-like beehive structure (honeycomb) net made only of carbon atoms. This honeycomb net formed by a single layer of carbon atoms is a carbon hexagon net called graphene, which is a round, cylindrical hollow tube with a diameter of 1 to 2 nm. A single-walled carbon nanotube is produced by the arc discharge method whereby an arc discharge is implemented between carbon electrodes, or by the carbon laser evaporation method or hydrocarbon gas thermo-decomposition method.

A multi-walled carbon nanotube (MWCNT) has an outer diameter of 5 to 50 nm and its center cavity has a diameter of 3 to 10 nm. Among multi-walled carbon nanotubes, those having the least number of layers are double-walled carbon nanotubes (DCNT). Double-walled carbon nanotubes can be produced via arc discharge in a hydrogen gas ambience using iron, nickel, cobalt or sulfur as a catalyst. They can also be produced using the chemical vapor deposition method. These nanotubes have a diameter of 3 to 5 nm and the interval between the two graphene layers is 0.39 nm.

Multi-walled carbon nanotubes (MWCNT) having more than two layers comprise several to several tens of layers of graphene. A multi-walled carbon nanotube can be deposited on the surface of a carrier constituted by fine magnesium oxide grains, fine alumina grains or heat-resistant zeolite by thermally decomposing methane, acetylene, carbon monoxide or other carbon-containing gas in the presence of iron, nickel, iron molybdenum or other catalyst. Multi-walled carbon nanotubes have favorable properties in terms of tensile strength, heat capacity, heat conductivity, etc., and are expected to be useful in composites. (*Kabon Nanochubu no Zairyo Kagaku Nyumon* (Introductory Materials Science of Carbon Nanotubes) by Yahachi Saito, Corona Publishing Co., Ltd., Mar. 22, 2005, pp. 1-20, 37-55). All these multi-walled carbon nanotubes are known and purchased products can be used.

A carbon fiber is obtained by carbonizing an organic high-molecular fiber (cellulose or polyacrylnitrile fiber) through a series of heating steps involving temperatures of 800 to 3000° C. while maintaining the original fiber shape, or by heating a spun pitch fiber. Carbon fibers can be added to plastics to form composites offering higher tensile strength (*Kagaku Daijiten* (Encyclopedic Dictionary of Chemistry), Kagaku-Dojin Publishing Co., Inc., 1989, p. 1377). All these carbon fibers are known and purchased products can be used.

A carbon black (CB) is obtained through gas-phase thermal decomposition or incomplete combustion of a natural gas or hydrocarbon gas. Carbon blacks can be used as reinforcement fillers for rubbers, materials for carbon products, and in printing inks, among others (*Kagaku Daijiten* (Encyclopedic Dictionary of Chemistry), Kagaku-Dojin Publishing Co., Inc., 1989, p. 1377). All these carbon blacks are known and purchased products can be used.

Fine clay grains refer to layer silicates. They are also called phyllosilicates. Layer silicates are a group of silicates having a layered structure in which a tetrahedron constituted by Si or Al surrounded by four oxygen molecules shares three apexes with the adjacent tetrahedrons to form a two-dimensionally expanding structure unit (tetrahedral sheet). An octahedral sheet formed by two-dimensionally connected octahedrons each constituted by Mg, Al, etc., surrounded by six oxygen or OH molecules is also an important constituent. There is perfect cleavage parallel to the layer surface, and generally layer silicates have a sheet or flake-like form. Chemically, they are hydrate silicates of Al, Mg, Fe, alkalis, etc. (*Nendo no Jiten* (Clay Dictionary), Asakura Publishing Co., Ltd., Jul. 20, 1985, p. 225). All these layer silicates are known and purchased products can be used.

Crystalline layer silicates include Purifeed (trademark, Tokuyama Corp., anhydrous crystalline layer sodium silicate), which is known as a multi-functional builder. As anhydrous crystalline layer sodium silicates, they have a layered crystalline structure, and $Ca^{++}$, $Mg^{++}$ and other hard constituents of water can be introduced effectively between the layers.

A polyamide composite layer silicate in which a layer silicate is dispersed in a polyamide resin is known (Japanese Patent Laid-open No. Hei 7-47644). As for nanocomposite materials using fine clay grains, nylon 6/montmorillonite nanocomposites obtained by ring-opening polymerization of nylon monomers (E-caprolactam) in the presence of an organically processed montmorillonite as for nanocomposite materials using fine clay grains, nylon 6/montmorillonite nanocomposites obtained by ring-opening polymerization of nylon monomers (ϵ-caprolactam) in the presence of an organically processed montmorillonite are known (U.S. Pat. No. 4,739,007, Japanese Patent Laid-open No. Sho 60-217396, Japanese Patent Laid-open No. Sho 61-95780, Japanese Patent Laid-open No. Hei 11-310643, and Japanese Patent Laid-open No. 2000-136308). All these literatures mention uniform dispersion, but they do not achieve satisfactory results because no physical force is applied in particular.

Silica grains refer to those synthetic silicas having fine continuous net-like holes formed by a group of silicon dioxide grains. Steam and various other substances can also be adsorbed to the inside of these fine holes. Silica production methods are largely divided into two, which are: (1) precipitating silica by neutralization or decomposition reaction of an acid or alkali metal salt of an aqueous sodium silicate solution (wet method), and (2) precipitating silica by high-temperature vapor phase reaction (dry method). Fine silica grains are ultra-fine grains obtained by adjusting the cohesiveness of silica grains, and have a sharp grain size distribution and exhibit good dispersibility. Silica grains are utilized in many ways, such as matting agents for various paints, inks, reforming agents, laser surface processing agents, special rubbers (reinforcing agents, etc.), and resins (anti-blocking agents), among others (examples include E-200A, E-220A, K-500, E-1009, E-1011, E-1030, E-150J, E-170, E-200 and E-220 (product names) by Tosoh Corporation).

Tokusil (trademark, Tokuyama Corp.) comprises ultra-fine (approx. 2 nm) single grains connected in a string-like form, and many of these strings are intertwined to form a cohesive, three-dimensional net-like structure. The true specific gravity of this wet silica is 2.0 g/cm$^3$, but because of the net-like structure it has many internal voids and appears to be a cottony, lightweight white powder.

Silica sols are known as covering agents for various material substances (Japanese Patent Laid-open No. 2004-136164). By dispersing fine silica grains having a nano-level grain size in a resin, the mechanical performance properties of the resin, such as heat resistance, can be improved while maintaining the transparency of the resin.

Cage polysilsesquioxanes (POSS) can be used. A cage polysilsesquioxane (POSS) compound is a new filler having a three-dimensional cage structure and offering the advantages of both inorganic and organic compounds. Because the three-dimensional cage structure has non-reactive groups (such as methyl groups, isobutyl groups, isooctyl groups and other alkyl groups as well as phenyl groups) or functional groups for polymerization or grafting (such as aminopropyl groups, epoxy groups, halogen groups, thiol groups and acryl groups) bonded to silicon atoms, the mechanical characteristics, heat resistance, optical characteristics, gas permeability, flame resistance, chemical resistance and other properties of existing materials can be improved dramatically by selecting POSS compounds having desired functional groups and dispersing them in resins, rubbers, etc., microscopically.

As for cage polysilsesquioxanes (POSS), various types of cage polysilsesquioxane compounds are known. An example is shown below (Japanese Patent Laid-open No. 2006-285017).

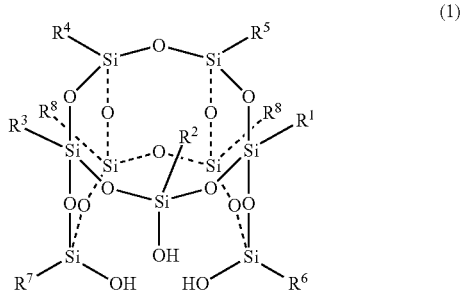

(1)

(In the formula, $R^1$ to $R^9$ are all or individually a methacryl group, epoxy group, methyl group, fluoroalkyl group or $CF_3$ $(CF_2)n\text{-}R^{10}$; where $R^{10}$ is a non-substituent or substituent bivalent hydrocarbon group having a carbon number from 1 to 12, while n is an integer of 0 to 10.)

How a cage polysilsesquioxane is synthesized is explained below.

Examples of the alkoxy silane used in the synthesis of the cage polysilsesquioxane expressed by general formula (1) above include, among others, 3-glycidoxy propyl trimethoxy silane, 2-(3,4-epoxy cyclohexyl)ethyl trimethoxy silane, 3-methacryloxy propyl trimethoxy silane, and 3,3,3-trifluoropropyl trimethoxy silane.

Here, the cage polysilsesquioxane to be obtained can be changed by selecting an alkoxy silane as appropriate. To be specific, 3-glycidoxy propyl trimethoxy silane, 2-(3,4-epoxy cyclohexyl)ethyl trimethoxy silane or 3-methacryloxy propyl trimethoxy silane can be used.

The sizes of these filling materials are generally in a range of several nm to several tens of nm. All these filling materials are known substances and commercially available.

By further molding a melt-kneaded product obtained from a filling material with an elastomer or resin using the aforementioned method, a molded resin product can be obtained. If an elastomer is used, the obtained molded resin product provides a significantly improved modulus of elasticity.

This molded resin product can have a rod, film, sheet or fiber form. Molded resin products of these shapes can be used in various parts and members including films, sheets and tubes, in the forms of flexible hoses, rings and sealants. They can also be used in automotive parts, mechanical parts in various fields including electrical and electronics, or as vibration-absorbing materials and anti-vibration materials having electrical conductivity.

A possible molded elastomer product obtained by at least an embodiment of the present invention has isolated MWCNT with a diameter of 10 to 40 nm uniformly dispersed in a SBBS matrix. The aforementioned molded resin product has been confirmed to have isolated MWCNT with a diameter of 10 to 40 nm uniformly dispersed in a SBBS matrix and exhibit a modulus of elasticity corresponding to 1.5 to 3.6 times the modulus of elasticity of SBBS alone (12.5 MPa).

A molded product obtained by at least an embodiment of the present invention has isolated MWCNT with a diameter of 10 to 40 nm uniformly dispersed in a PVDF matrix, where the volume conductivity is $10^{-3}$ (S/cm) or more when 2 percent by weight of MWCNT is added.

A molded product comprising the aforementioned filling material constituted by a filler, and the aforementioned elastomer, can be obtained, where isolated multi-walled carbon nanotubes with a diameter of 10 to 40 nm are uniformly dispersed in a PLLA matrix.

A molded product has isolated MWCNT with a diameter of 10 to 40 nm uniformly dispersed in a PLLA matrix, where the volume conductivity is $10^{-1}$ (S/cm) or more when 2 percent by weight of MWCNT is added.

Next, the present invention is explained in details using examples. It should be noted, however, that the present invention is not at all limited to these examples. The structures and properties of molded resin products were measured using the following methods.

Structural Evaluation Using Scanning Electron Microscope (SEM)

A test piece was soaked in liquid nitrogen for 10 minutes and then fractured. After the fractured face was gold-deposited, a scanning electron microscope (SEM) by Philips (XL-20SEM) was used to observe the test piece at an acceleration voltage of 10 kV. This way, whether the filling material constituted by a filler was uniformly dispersed in the test piece or not could be observed.

Tensile Characteristics

A sheet from which molded resin products had been produced was cut out using a cutting knife to produce a dumbbell test piece. The tensile characteristics test was performed according to the method specified in ASTM D638. The stress vs. strain curve was measured using a tensile tester by Orientec Co., Ltd. (Tensilon UTM-300). This test was conducted in an ambience of 20° C. in temperature and 50% in relative humidity at a cross-head speed of 500 mm/min.

Evaluation of Elastic Recovery Factor

The elastic recovery factor test was conducted using the aforementioned tensile tester at a temperature of 20° C. and cross-head speed of 10 mm/min. In the test, the test piece was strained to 200%, and then strain was removed to a level of zero stress. The elastic recovery factor was obtained by this strain recovery test and is defined using the residual strain present when the stress becomes zero.

In the present disclosure where conditions and/or structures are not specified, the skilled artisan in the art can readily provide such conditions and/or structures, in view of the present disclosure, as a matter of routine experimentation. Also, in the present disclosure, the numerical numbers applied in embodiments can be modified by a range of at least ±50% in other embodiments, and the ranges applied in embodiments may include or exclude the endpoints.

Example 1

(1) Composite Material Comprising Elastomer and Filling Material

The following materials were used.

For the elastomer, poly(styrene-b-butadiene-co-butylene-b-styrene) (hereinafter also referred to as "SBBS") was used. The SBBS used was a styrene/butadiene/butylene/styrene copolymer in a pellet form. Specifically, N503 by Asahi Kasei Corporation (Japan) with an average molecular weight (Mw) of 40000 g/mol and styrene content of 30 percent by weight was used.

For the filling material, a multi-walled carbon nanotube (MWCNT) was used.

The MWCNT used was one of 10 to 40 nm in diameter, 5 to 20 µm in length and having high purity (approx. 95%) manufactured by CNT Co., Ltd. (Korea). The multi-walled carbon nanotube was used directly.

(2) Pretreatment

Before kneading, the elastomer (SBBS) and multi-walled carbon nanotube (MWCNT) were dried for at least 12 hours at 80° C. Next, 100 parts by weight of SBBS pellets and 3 parts by weight of MWCNT were introduced to a high-shear molding machine HSE3000mini by Imoto Seisakusho Co., Ltd. (Japan) and melt-kneaded for 4 minutes at screw rotation speeds of 300 rpm, 1000 rpm and 2000 rpm, respectively, at 200° C.

The obtained blends were crushed and then thermo-pressed at 200° C. to obtain sheets. The obtained blend compositions had MWCNT grains dispersed in a SBBS matrix at different levels corresponding to the screw rotation speeds. Also, the obtained sheets were confirmed to have a glossy surface of excellent properties.

FIG. 4 shows cross-sectional scanning electron microscope (SEM) photographs of SBBS/MWCNT (3%) composites produced at different screw rotation speeds in Example 1.

Figure 4A:
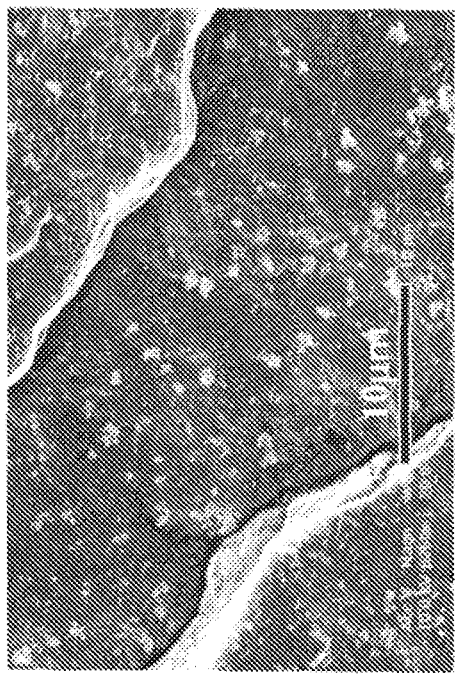
FIG. 4 shows cross-sectional scanning electron microscope (SEM) photographs of SBBS/MWCNT (3%) composites produced at different screw rotation speeds. Composites obtained at 300 rpm, 1000 rpm, 2000 rpm, and 2000 rpm are shown in (a), (b), (c), and (d), respectively ((d) has a higher magnification than (c)).

As shown by the figure, cohesion of 5 to 50 μm was observed at the screw rotation speed of 300 rpm (FIG. 4(a)). It should be noted that 300 rpm is beyond the normal rotation speeds of extruders.

Figure 4B:
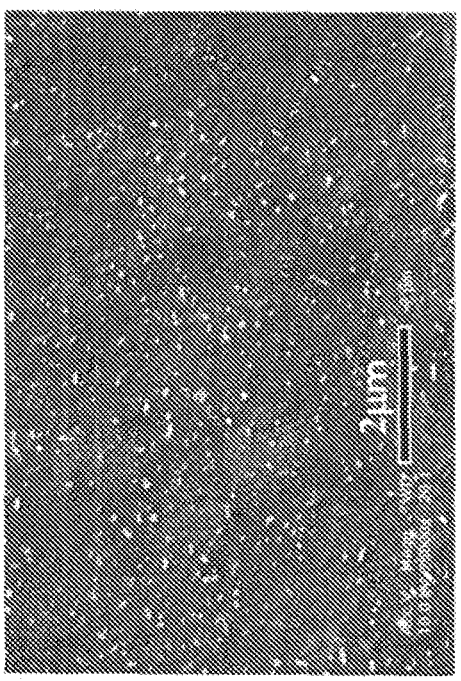

The sample produced at the screw rotation speed of 1000 rpm had a reduced level of MWCNT cohesion of several μm (FIG. 4(b)).

Figure 4C:
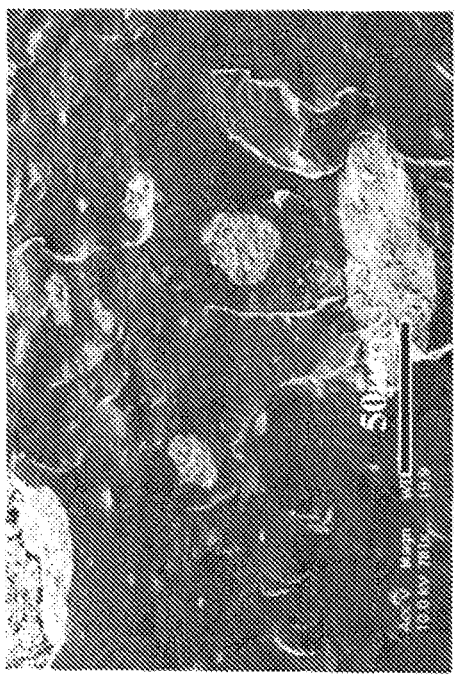

With the sample produced at the screw rotation speed of 2000 rpm, the cohesion structure was not visible and MWCNT grains had a size of 20 to 50 nm roughly corresponding to isolated grains (FIG. 4(c), low magnification factor). For your information, 20 to 50 nm correspond to MWCNT diameters.

Figure 4D:
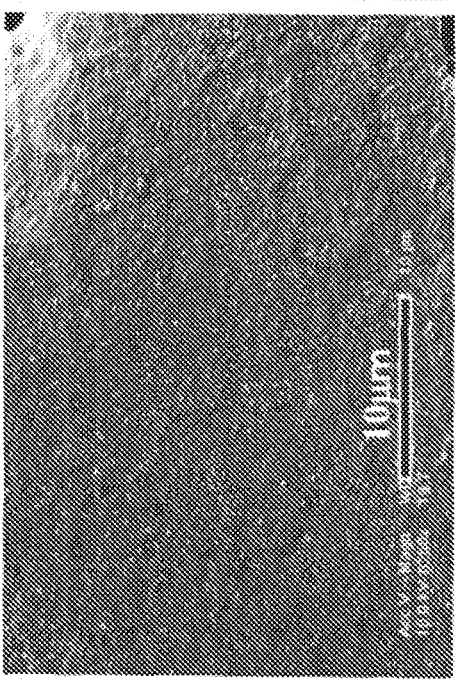

The sample produced at the screw rotation speed of 2000 rpm was observed at a high magnification factor (FIG. 4(d), high magnification factor).

By using the high-shear molding machine HSE3000mini, a state of nano-dispersion in resin could be realized and confirmed for a conventional MWCNT which had been difficult to disperse microscopically.

Figure 5A:
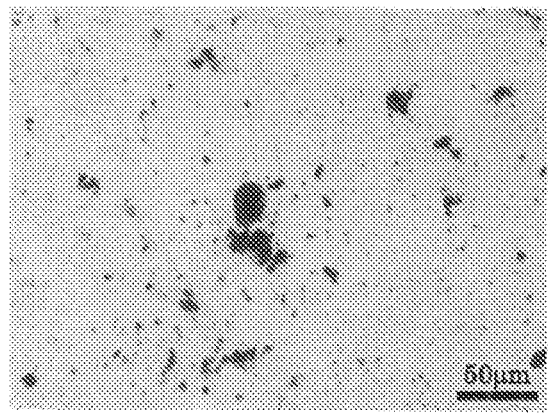
FIG. 5 shows optical microscope views of films molded from a toluene solution of MWCNT/SBBS composite. Results of processing at 300 rpm, 1000 rpm and 2000 rpm are shown in (a), (b) and (c), respectively.
Figure 5B:
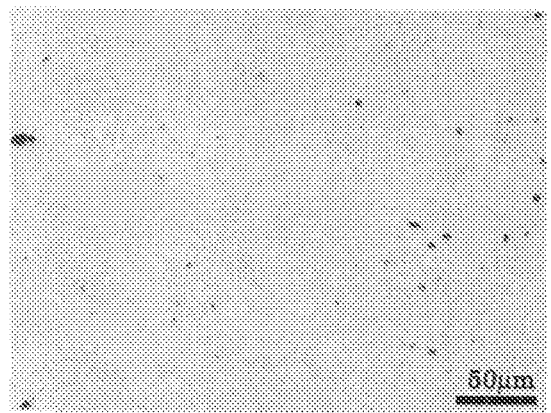
Figure 5C:
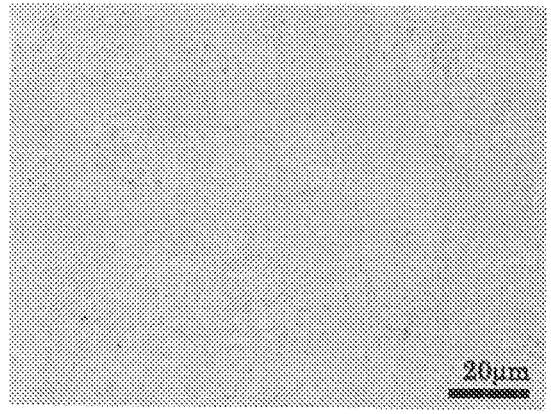

FIG. 5 shows the results of observation using an optical microscope.

These results are of films molded from a toluene solution of MWCNT/SBBS composite. The results of processing the films at 300 rpm, 1000 rpm, and 2000 rpm, are shown in (a), (b) and (c), respectively.

FIG. 6 shows Lorenz-corrected SAXS profiles. A pure sample, sample processed at 1000 rpm, and sample processed at 2000 rpm are shown as (a), (b) and (c), respectively.

Figure 7:
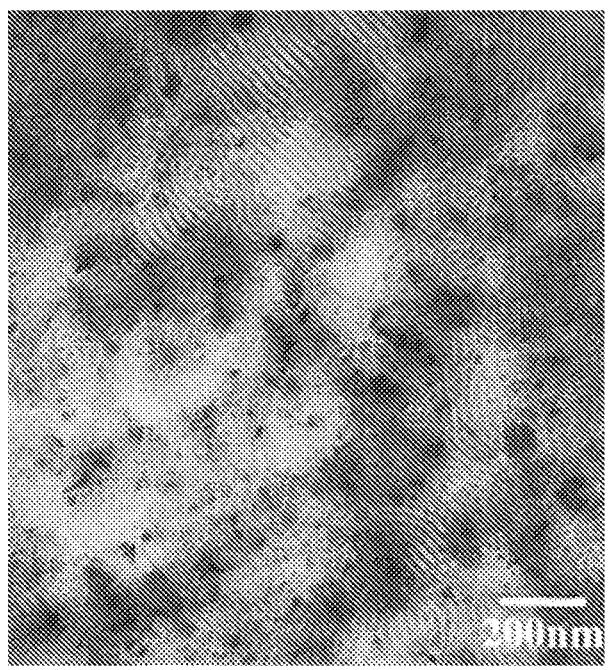
FIG. 7 is a TEM photograph of a composite obtained at 2000 rpm.

FIG. 7 is a TEM photograph of the composite obtained at 2000 rpm. The black dots indicate dispersed carbon nanotubes.

Figure 8:
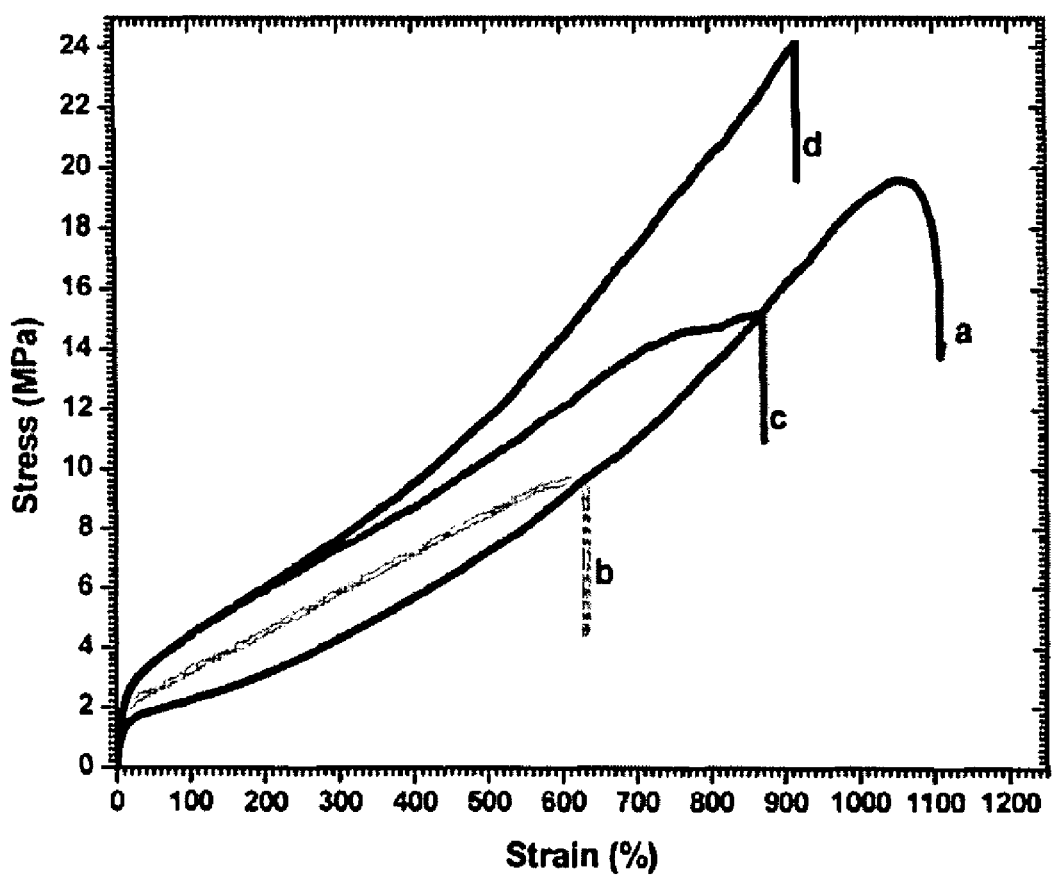
FIG. 8 shows stress vs. strain curves of molded resin products produced at different screw rotation speeds.

FIG. 8 shows the stress vs. strain curves of molded resin products produced at different screw rotation speeds in Example 1. In this figure, the curve of SBBS alone (a) and those of SBBS/MWCNT (3%) composites produced at different screws ((b) 300 rpm, (c) 1000 rpm and (d) 2000 rpm) are shown. Clearly, they have a good correlation with the SEM observation results shown in FIG. 4, and the structure where the MWCNT adhered to several tens of μm (300 rpm) showed around a half of the elongation at break exhibited by SBBS alone. Also, the structure where the MWCNT adhesion was much less at several μm (1000 rpm) exhibited only around 70% of the elongation at break exhibited by SBBS alone.

However, the structure obtained at 2000 rpm where virtually isolated MWCNT grains were dispersed microscopically exhibited a level of elongation at break comparable to that of SBBS alone.

Another notable point in FIG. 8 is that the modulus of elasticity estimated at the first rise of the stress vs. strain curve improved significantly in direct proportion to the dispersibility of MWCNT. The above mechanical performance properties are summarized in Table 1.

TABLE 1

Mechanical Performance Properties of SBBS Alone and SBBS/MWCNT (3%) Nanocomposites Produced at Different Screw Rotation Speeds (CP300: 300 rpm, CP1000: 1000 rpm, CP2000: 2000 rpm)

| | Modulus (MPa) | Elongation at break (%) | Strength (MPa) | Residual strain (%) |
|---|---|---|---|---|
| Neat SBBS | 12.50 | 1108 | 19.59 | 20.34 |
| CP 300 | 14.31 | 628 | 9.45 | 34.41 |
| CP 1000 | 23.74 | 870 | 14.99 | 30.22 |
| CP 2000 | 25.31 | 917 | 24.08 | 22.63 |

As shown in Table 1, the modulus of elasticity improved in direct proportion to the dispersibility of MWCNT, and the sample obtained at 2000 rpm where virtually isolated MWCNT grains were microscopically dispersed had more than twice the modulus of elasticity of SBBS alone. The breaking strength of this particular sample was also higher by 23%. In other words, as far as the mechanical performance properties of a SBBS/MWCNT (3%) nanocomposite is concerned, its modulus of elasticity and other properties can be improved to twice or more while maintaining the elastomer properties of SBBS (mechanical elongation at break, etc.) by nano-dispersing MWCNT at the screw rotation speed of 2000 rpm.

Figure 9:
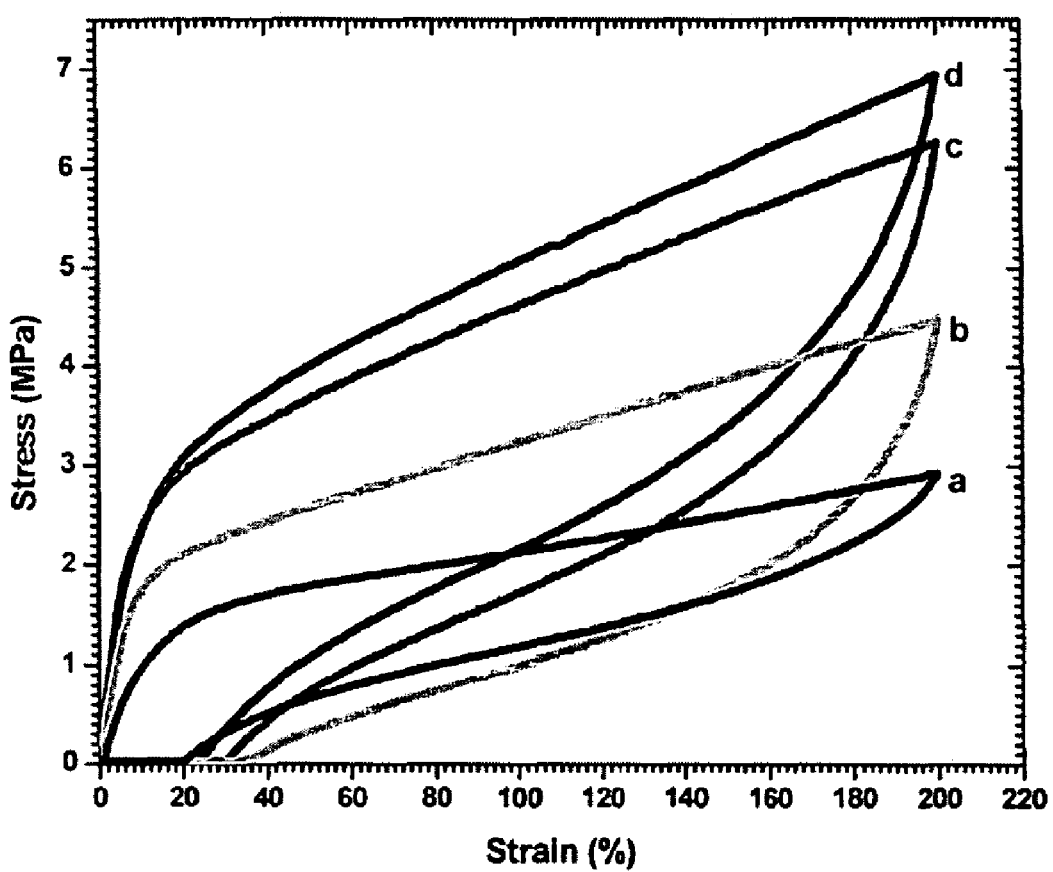
FIG. 9 shows recovering strain curves of molded resin products produced at different screw rotation speeds.

FIG. 9 shows the recovering strain curves of molded resin products produced at different screw rotation speeds in Example 1.

In the figure, the smaller the residual strain at the point of zero stress along the recovering strain curve, the better the elastomer. The same trend shown in elongation at break in FIG. 8 was also present here, and the residual strain decreased gradually in direct proportion to the dispersibility of MWCNT. The individual residual strain values are also shown in the far right column of Table 1. The sample produced at 2000 rpm where virtually isolated MWCNT grains were microscopically dispersed had a residual strain (22.63%) comparable to that of SBBS alone (20.34%).

Example 2

Using the same apparatuses and procedures employed in Example 1, 100 parts by weight of SBBS pellets and varying contents by weight of MWCNT (varied over a range of 1.5 to 6.0%) were mixed and melt-kneaded for 4 minutes at a screw rotation speed of 2000 rpm. The obtained blends were crushed and then thermo-pressed at 200° C. to obtain sheets. The obtained blend compositions had MWCNT grains dispersed microscopically in a SBBS matrix. Also, the obtained sheets were confirmed to have a glossy surface of excellent properties.

Figure 10:
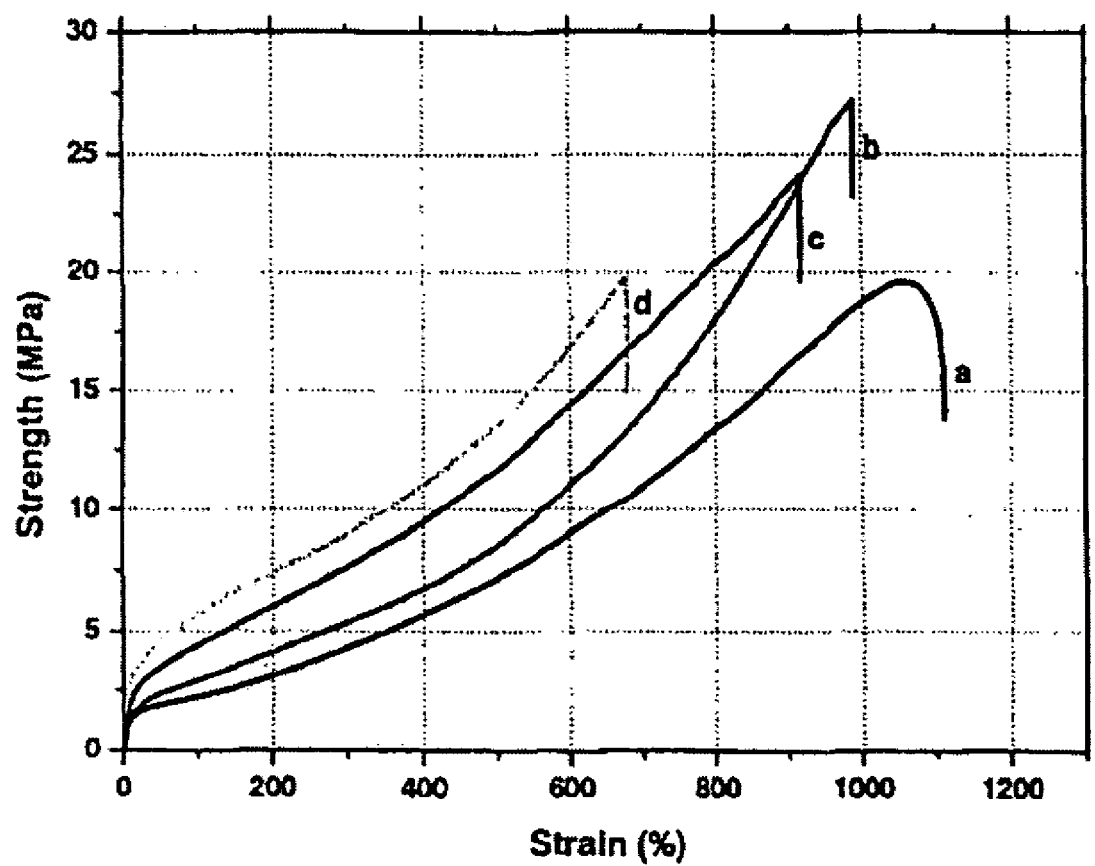
FIG. 10 shows stress vs. strain curves of molded resin products produced at different MWCNT contents by weight.

FIG. 10 shows the stress vs. strain curves of molded resin products produced with different MWCNT contents by weight in Example 2. As evident from this figure, nano-dispersing MWCNT at the screw rotation speed of 2000 rpm still resulted in the elongation at break, being a mechanical performance property of the produced sample, decreasing along with the MWCNT content.

On the other hand, the modulus of elasticity increased in direct proportion to the MWCNT content. (Refer to Table 2.)

FIG. 10 shows the results of samples (a) comprising SBBS alone, (b) containing 1.5 percent by weight of MWCNT, (c) containing 3.0 percent by weight of MWCNT, and (d) containing 6.0 percent by weight of MWCNT.

TABLE 2

Mechanical Performance Properties of SBBS Alone and SBBS/MWCNT Nanocomposites Produced at Screw Rotation Speed of 2000 rpm with Different MWCNT Contents.

| | Modulus (MPa) | Elongation at break (%) | Strength (MPa) |
|---|---|---|---|
| Neat SBBS | 12.50 | 1108 | 19.59 |
| 1.5 wt % | 18.47 | 989 | 26.81 |
| 3.0 wt % | 25.31 | 917 | 24.08 |
| 6.0 wt % | 44.68 | 673 | 19.9 |

As evident from Table 2, nano-dispersing MWCNT at the screw rotation speed of 2000 rpm had the effect of decreasing the elongation at break, being a mechanical performance property of the produced sample, along with the MWCNT content, while increasing the modulus of elasticity in direct proportion to the MWCNT content. Also, while the breaking strength increased straight to 26.81 MPa when a small amount (1.5%) of MWCNT was added, the breaking strength decreased thereafter along with the MWCNT content and became roughly the same as the breaking strength of SBBS alone at a MWCNT content of 6%.

Figure 11:
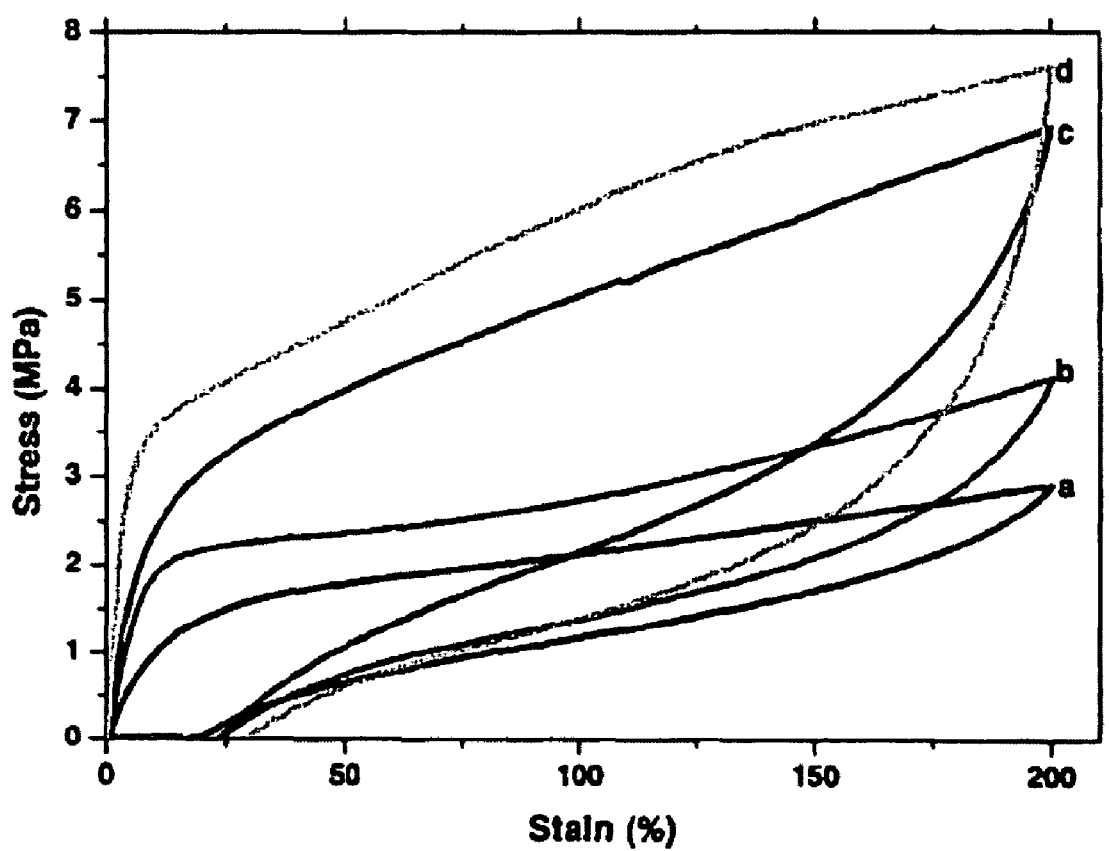
FIG. 11 shows recovering strain curves of molded resin products produced at different MWCNT contents by weight.

FIG. 11 shows the recovering strain curves of molded resin products produced with different MWCNT contents by weight in Example 2. In the figure, the smaller the residual strain at the point of zero stress along the recovering strain curve, the better the elastomer. Since nano-dispersion of MWCNT was achieved at the screw rotation speed of 2000 rpm, an excellent recovery factor of modulus of elasticity was observed reflecting the nano dispersibility and independent of the MWCNT content. FIG. 11 shows the results of samples (a) comprising SBBS alone, (b) containing 1.5 percent by weight of MWCNT, (c) containing 3.0 percent by weight of MWCNT, and (d) containing 6.0 percent by weight of MWCNT.

A new molded resin product obtained in at least an embodiment of the present invention provides a new elastomer of high modulus of elasticity that maintains excellent elastomer performance properties while also offering improved levels of mechanical performance properties such as modulus of elasticity, where these improved properties can be achieved easily by adding a small amount of MWCNT, and accordingly such elastomer can be used in various parts and members including films, sheets and tubes, in the forms of flexible hoses, rings and sealants. These elastomers offer high industrial applicability as they can also be used in automotive parts, mechanical parts in various fields including electrical and electronics, or as vibration-absorbing materials and anti-vibration materials.

Example 3

Sample Substances

A polyvinylidene fluoride (PVDF) (KF850 by Kureha Corporation) was dried for 24 hours at 80° C. in a vacuum oven before use. A multi-walled carbon nanotube (MWCNT) by Sigma-Aldrich Corporation was used. The multi-walled carbon nanotube was produced by the carbon CVD method and had a purity of 95% or more. Its outer diameter was 10 to 20 nm and inner diameter was 5 to 10 nm. The oxidation starting temperature was 552.8° C. based on TGA measurement, and the bulk density was 2.1 g/cm$^3$.

Conditions of Melt-Kneading Apparatus

A melt-kneading apparatus using the aforementioned recirculation feedback screw 20 was used. The L/D ratio was 1.78. The screw rotation speed was 1000 rpm and corresponding shear speed was 1470 sec$^{-1}$. The space was 1 mm and the product was taken out from the T-dies.

Sample Preparation

The multi-walled carbon nanotube (MWCNT) was not chemically processed. A PVDF/MWCNT composite was produced by processing for 4 minutes at 220° C. The dried flakes were pressed for 1 minute under 4 tons at 220° C. to obtain samples of 0.1 mm in thickness for conductivity measurement as well as samples of 0.5 mm in thickness for measurement of rheological characteristics. As a comparative example, samples were also obtained using a normal extruder operated at 100 rpm. The corresponding shear speed was 50 sec$^{-1}$.

The results of rheological measurement are shown in Table 3.

TABLE 3

Sample names and rheology results for PVDF/MWCNT composites

| Sample name | Rotation speed (rpm) | MWCNT loading (wt %) | Low-frequency slope of G' |
|---|---|---|---|
| PVDF | — | 0 | 1.77 |
| PVDF10 | 1000 | 0.2 | 1.40 |
| PVDF20 | 1000 | 0.39 | 1.02 |
| PVDF30 | 1000 | 0.63 | 0.91 |
| PVDF40 | 1000 | 0.84 | 0.52 |
| PVDF50 | 1000 | 1.1 | 0.39 |
| PVDF60 | 1000 | 1.4 | 0.35 |
| PVDF70 | 1000 | 2.1 | 0.27 |
| PVDF80 | 1000 | 2.9 | 0.20 |
| PVDF90 | 1000 | 3.9 | 0.09 |
| PVDF1 | 100 | 0.23 | 1.54 |
| PVDF2 | 100 | 0.49 | 1.33 |
| PVDF3 | 100 | 0.62 | 1.24 |
| PVDF4 | 100 | 0.78 | 0.90 |
| PVDF5 | 100 | 1 | 0.88 |
| PVDF6 | 100 | 1.2 | 0.76 |
| PVDF7 | 100 | 1.9 | 0.51 |
| PVDF8 | 100 | 2.8 | 0.37 |
| PVDF9 | 100 | 3.9 | 0.19 |

FIG. 12 shows SEM photographs of the transverse cross-section structures of PVDF complexes containing 2 percent by weight of MWCNT being cooled by liquid nitrogen.

Figure 12A:
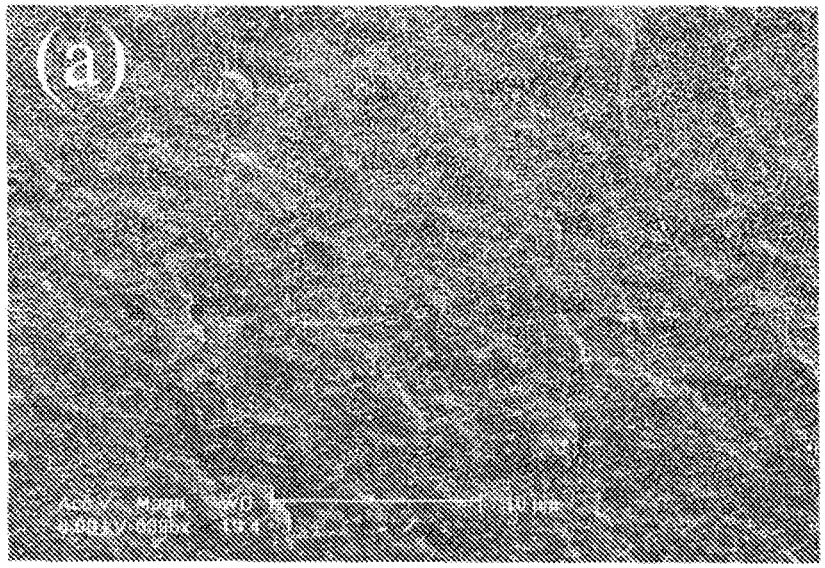
FIG. 12 shows SEM photographs of the structures of fractured sections created by cooling a PVDF complex containing 2 percent by weight of MWCNT using liquid nitrogen under high shear force shown in (a) and (b) and under low shear force shown in (c) and (d).

FIGS. 12(a) and (b) are SEM photographs of complexes produced under high shear force.

Figure 12B:
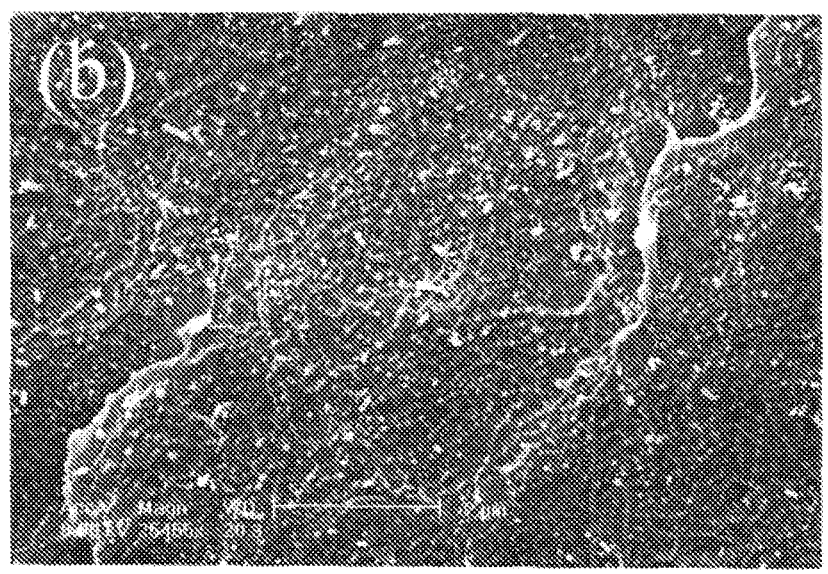
Figure 12C:
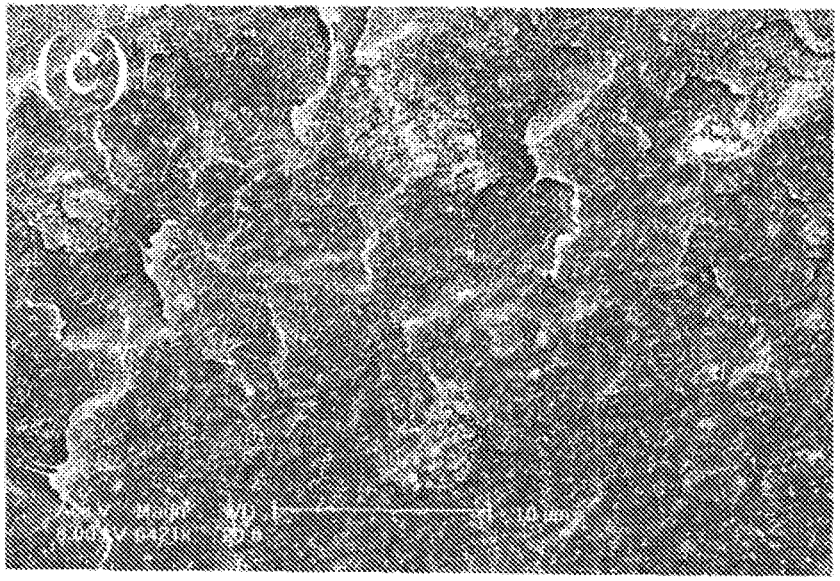

FIGS. 12(c) and (d) are SEM photographs of complexes produced under low shear force.

The bright spots and lines in FIG. 12 correspond to broken MWCNT.

In FIGS. 12(a) and (b), MWCNT is dispersed in the PVDF matrix without cohering under high shear force.

In FIG. 12(b), the nanotube diameter is 40 nm, which corresponds to 30 to 50 nm in initial diameters of individual nanotubes. Also, nanotubes completely peeled off and became separated from each other in the PVDF.

Figure 12D:
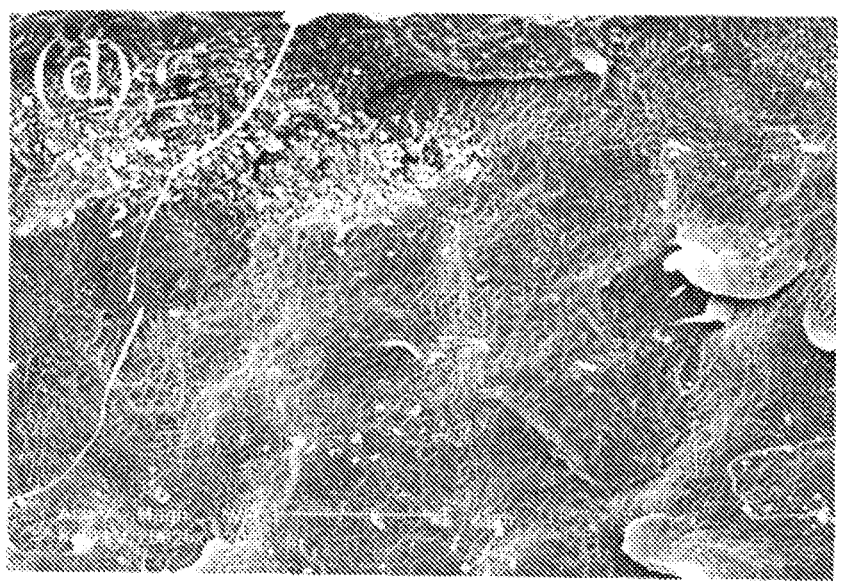

FIGS. 12(c) and (d) show cohered grains. In FIG. 12(d), nanotubes concentrate without being dispersed.

Figure 13A:
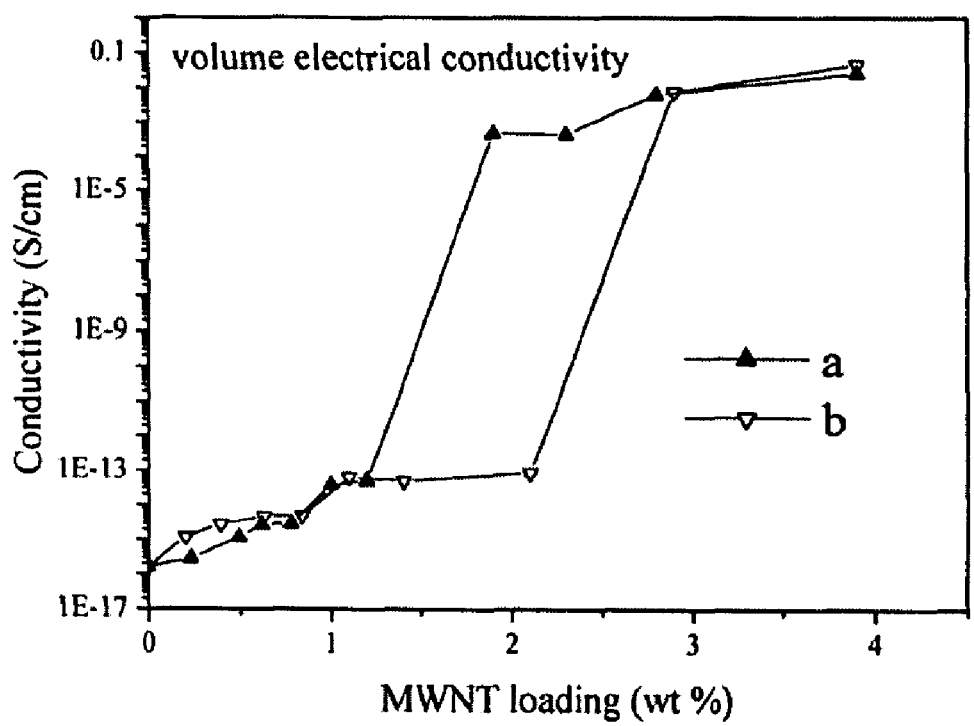
FIG. 13 shows the relationship of electrical conductivity (volume conductivity in 13a; surface conductivity in 13b) relative to MWCNT content.
Figure 13B:
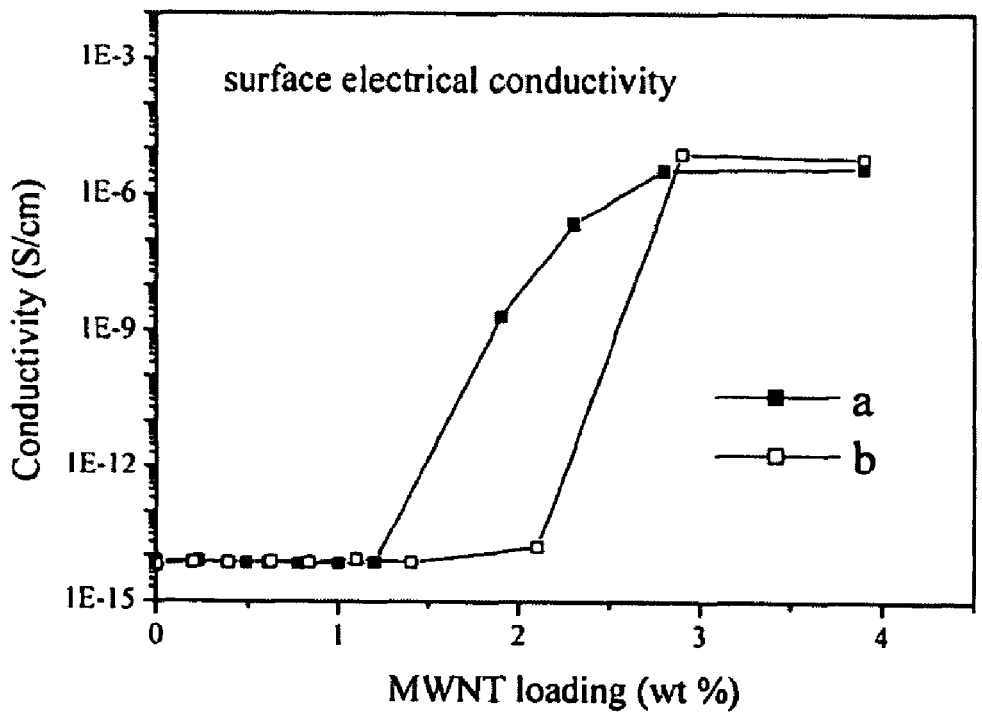

FIG. 13 shows the relationship of conductivity relative to MWCNT content. The top graph in FIG. 13 shows the volume conductivity, while the bottom graph in FIG. 13 shows the surface conductivity. In the graphs, a indicates the result obtained by high shear force, while b indicates the result obtained by low shear force. In the FIG. 13 graph showing volume conductivity, the conductivity level gradually increased from a MWCNT content of 1.2 percent by weight ($4.9\times10^{-14}$ S/cm) to 1.9 percent by weight ($2.5\times10^{-2}$ S/cm), after which point the volume conductivity no longer increased notably. A similar trend is also found in surface conductivity. In the case of surface conductivity, the conductivity level increased when the MWCNT content was above 1.5 percent by weight, until the content reached 2.5 percent by weight.

Figure 14A:
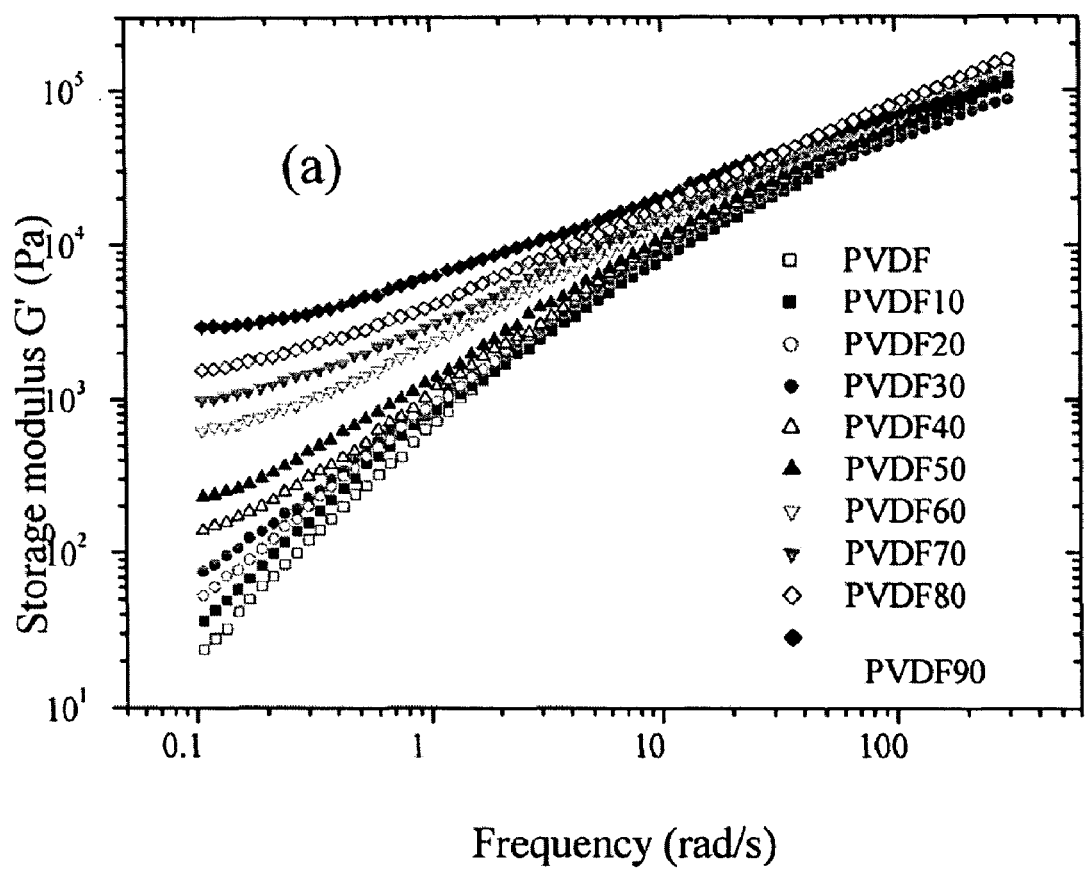
FIG. 14 shows the relationship of vibration frequency and dynamic modulus of elasticity under high shear force shown in (a) and under low shear force shown in (b) when MWCNT content is varied.
Figure 14B:
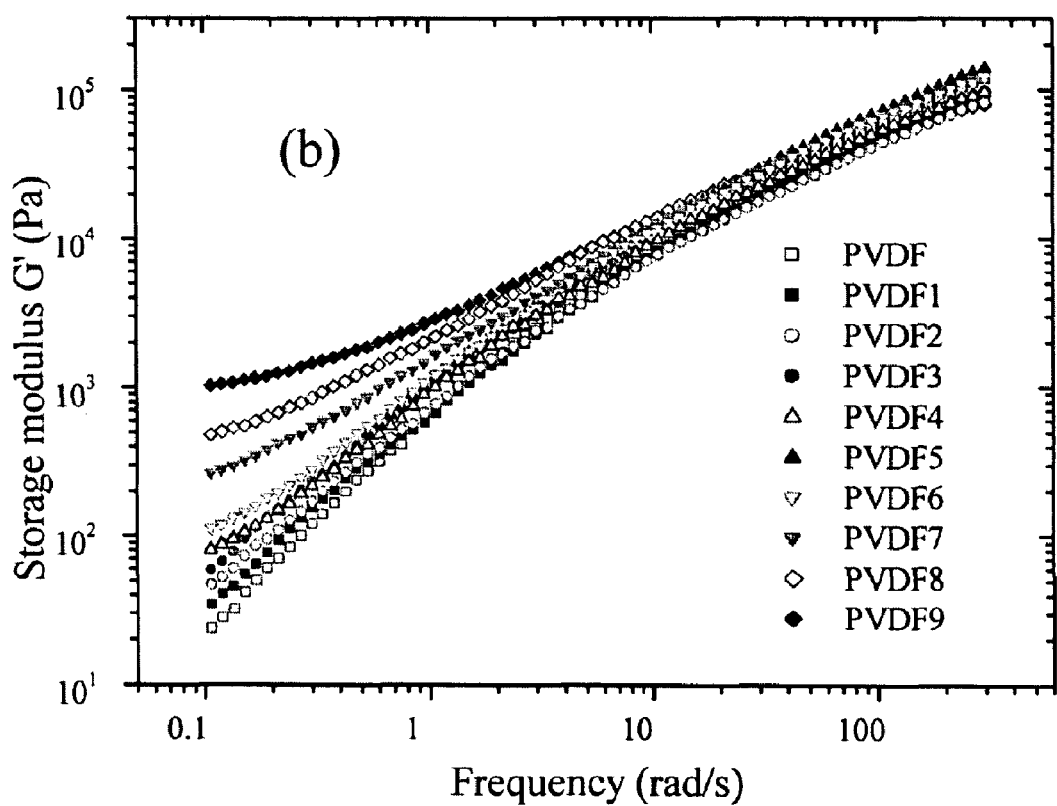

FIG. 14 shows the relationship of vibration frequency and dynamic modulus of elasticity at varying MWCNT contents.

The top graph (a) in FIG. 14 shows the result obtained by high shear force, while the bottom graph (b) in FIG. 14 shows the result obtained by low shear force.

The PVDF chain was completely relaxed at low vibration frequencies and exhibited end characteristics similar to those of typical homopolymers approximated by $G'\sim\omega^2$. However, these end characteristics disappeared when the nanotube content was below 1 percent by weight under high shear force, or below 2 percent by weight under low shear force, which suggests low G' dependence on $\omega$ at low vibration frequencies. In other words, presence of nanotubes has the effect of suppressing the relaxation by high polymers of large sizes in the composite.

The effects of nanotubes on rheological characteristics at high vibration frequencies are relatively small. This indicates that nanotubes have no impact on the dynamics of PVDF chains over a short range.

Figure 15A:
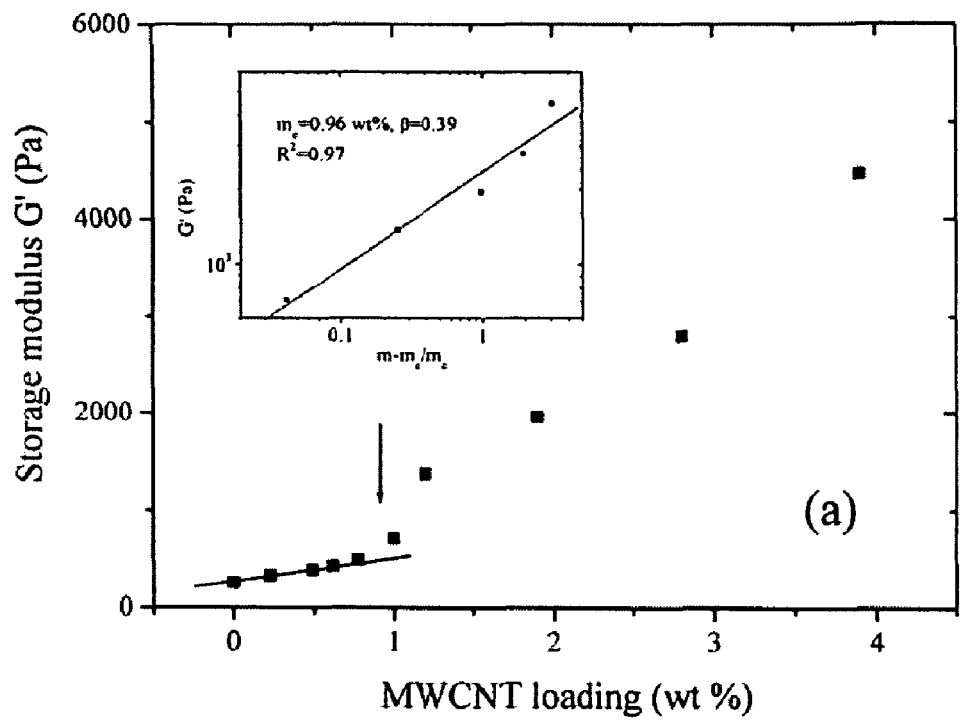
FIG. 15 shows the relationship of dynamic modulus of elasticity and nanotube content of a PVDF/MWCNT composite at a fixed vibration frequency of 0.5 rad/sec under high shear force shown in (a) and under low shear force shown in (b).
Figure 15B:
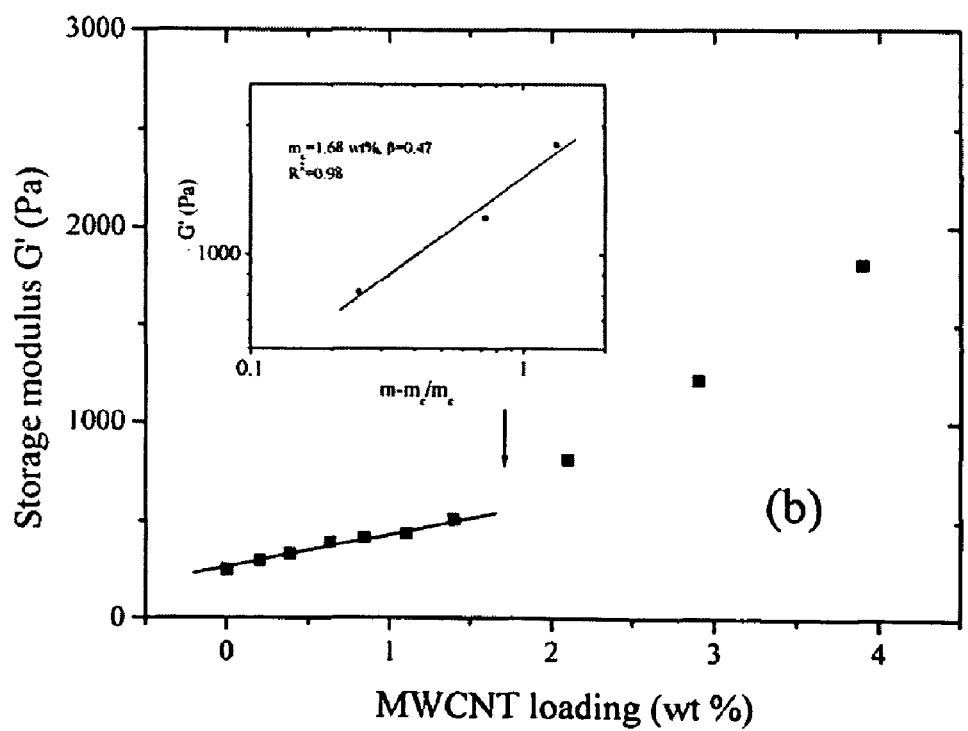

FIG. 15 shows the relationship of dynamic modulus of elasticity and nanotube content of a PVDF/MWCNT composite at a fixed vibration frequency of 0.5 rad/sec.

The top graph (a) in FIG. 15 shows the result obtained by high shear force, while the bottom graph (b) in FIG. 15 shows the result obtained by low shear force. The inserted graph is a Log-Log plot of the relationship of G' and reduction in mass.

According to the result shown in FIG. 15 (a), there is a sharp rise indicating a sudden change in substance structure when the content increases from 0.8 to 1.2 percent by weight. The sudden change in G' indicates that a PVDF/MWCNT composite produced by the method involving a high shear ratio is subject to a tipped rheological balance due to an inhibition by nanotubes of the polymer movement.

$$G'\propto(m-m_c)^\beta$$

G' indicates the storage modulus, m indicates the MWCNT mass fraction, while $m_c$ indicates the threshold of rheological percolation. $\beta$ indicates a critical exponent.

The inserted graph shows the $(m-m_c)/m_c$ dependency of G' in the MWCNT composite.

Raman spectrums of the initial MWCNT, which show (a) PVDF composite containing 2 percent by weight of MWCNT subjected to high shear force, and (b) PVDF composite containing 2 percent by weight of MWCNT subjected to low shear force, were obtained.

The vibration frequency of MWCNT in each composite rises only by $10^{-1}$ cm from the vibration frequency of initial MWCNT.

Figure 16:
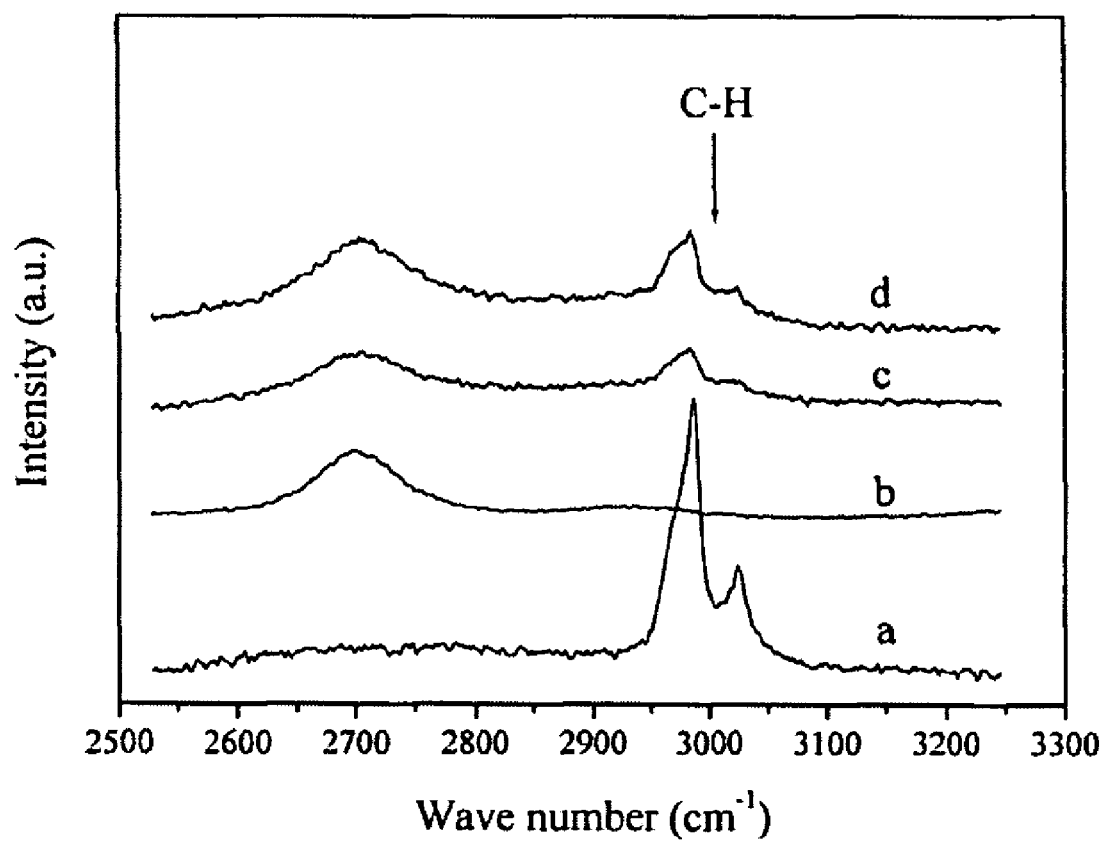
FIG. 16 shows Raman spectrums of C—H vibration based on (a) PVDF alone, (b) MWCNT and PVDF composite containing 2 percent by weight of MWCNT, (c) under high shear force, and (d) under low shear force.

FIG. 16 shows Raman spectrums of C-H vibration based on (a) PVDF alone, (b) MWCNT and PVDF composite containing 2 percent by weight of MWCNT, (c) under high shear force, and (d) under low shear force.

Example 4

Sample Substances

A polylactic acid (PLLA) (with a molecular weight of $1.7\times10^5$ g/mol and D-lactide content of 1.2%) was dried for 24 hours at 80° C. in a vacuum oven before use.

A multi-walled carbon nanotube (MWCNT) by Nikkiso Co., Ltd. was used. The multi-walled carbon nanotube was produced by the carbon CVD method and had a purity of 95% or more. Its outer diameter was 10 to 20 nm and inner diameter was 5 to 10 nm.

Conditions of Melt-Kneading Apparatus

A melt-kneading apparatus using the aforementioned recirculation feedback screw 20 was used. The L/D ratio was 1.78. The screw rotation speed was 1000 rpm and corresponding shear speed was 1470 sec$^{-1}$. The space was 1 mm and the product was taken out from the T-dies.

Sample Preparation

The multi-walled carbon nanotube (MWCNT) was not chemically processed. A PLLA/MWCNT composite was produced by processing for 4 minutes at 190° C. The dried flakes were pressed for 1 minute under 4 tons at 190° C. to obtain samples of 0.1 mm in thickness for conductivity measurement. As a comparative example, samples were also obtained using a normal extruder operated at 100 rpm. The corresponding shear speed was 50 sec$^{-1}$.

Figure 17:
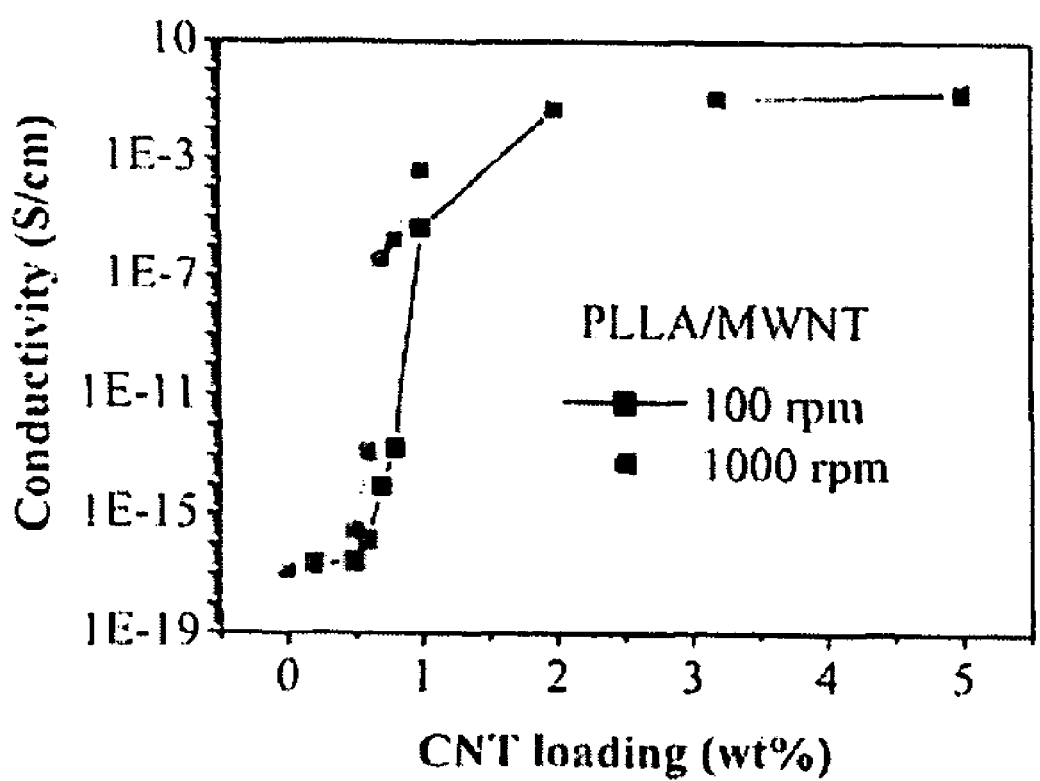
FIG. 17 shows the relationship of electrical conductivity relative to MWCNT content. The figure compares a molded sample obtained under high shear force (screw rotation speed: 1000 rpm) and a molded sample obtained under low shear force (100 rpm).

FIG. 17 shows the relationship of volume conductivity relative to MWCNT content. The green plot indicates the result obtained by high shear force. The threshold is very low at 0.6 percent by weight. On the other hand, the red data indicates the result obtained by low shear force. In FIG. 17 showing volume conductivity, the conductivity level suddenly rose when the MWCNT content exceeded 0.5 percent by weight, and increased until the content became 2 percent by weight ($10^{-1}$ S/cm), after which point the volume conductivity no longer increased notably. On the other hand, the trend in red pertaining to the sample obtained by low shear force shows a high threshold (1 percent by weight). In the case of surface conductivity, the conductivity level increased when the MWCNT content was above 0.8 percent by weight, until the content reached 2 percent by weight.

The present application claims priority to Japanese Patent Application No. 2007-76639, filed Mar. 23, 2007, and No. 2008-025964, filed Feb. 6, 2008, the disclosure of which is incorporated herein by reference in their entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A melt-kneaded product comprising:
    a disperse medium selected from an a rubber, elastomer, thermoplastic resin, or thermosetting resin; and
    a filling material constituted by isolated multi-walled carbon nanotubes as nano-size filler particles, said isolated multi-walled carbon nanotubes being individually dispersed uniformly in the disperse medium.

2. The melt-kneaded product according to claim 1, wherein the nano-size filler particles are isolated multi-walled carbon nanotubes with a diameter of 10 to 40 nm.

3. The melt-kneaded product according to claim 2, wherein the disperse medium is an elastomer.

4. The melt-kneaded product according to claim 3, wherein the elastomer is a matrix of poly(styrene-b-butadiene-co-butylene-b-styrene).

5. The melt-kneaded product according to claim 4, which has a modulus of elasticity 1.5 to 3.6 times that of poly(styrene-b-butadiene-co-butylene-b-styrene) alone.

6. The melt-kneaded product according to claim 2, wherein the disperse medium is a thermoplastic resin.

7. The melt-kneaded product according to claim 6, wherein the thermoplastic resin is a matrix of polyvinylidene fluorides.

8. The melt-kneaded product according to claim 7, which has a volume conductivity of $10^{-3}$ (S/cm) or more as measured when 2 percent by weight of the isolated multi-walled carbon nanotubes is added.

9. The melt-kneaded product according to claim 6, wherein the thermoplastic resin is a matrix of polyester resin constituted by polyactic acids.

10. The melt-kneaded product according to claim 9, which has a volume conductivity of $10^{-1}$ (S/cm) or more as measured when 2 percent by weight of the isolated multi-walled carbon nanotubes is added.

11. The melt-kneaded product according to claim 1, which is shaped in a molded product.

12. The melt-kneaded product according to claim 11, wherein the molded product is a rod, film, sheet or fiber.

* * * * *